(12) United States Patent
Whelan et al.

(10) Patent No.: US 10,206,161 B2
(45) Date of Patent: Feb. 12, 2019

(54) WIRELESS COMMUNICATIONS SYSTEM AND METHOD FOR MANAGING AND OPTIMIZING A WIRELESS COMMUNICATIONS NETWORK

(71) Applicant: The Boeing Company, Chicago, IL (US)

(72) Inventors: David A. Whelan, Newport Coast, CA (US); Ying J. Feria, Manhattan Beach, CA (US); James P. Scott, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 15/292,385

(22) Filed: Oct. 13, 2016

(65) Prior Publication Data
US 2018/0109991 A1    Apr. 19, 2018

(51) Int. Cl.
| H04W 4/00 | (2018.01) |
| H04W 40/22 | (2009.01) |
| H04W 76/14 | (2018.01) |
| H04B 7/185 | (2006.01) |
| H04W 24/02 | (2009.01) |
| H04W 24/08 | (2009.01) |

(52) U.S. Cl.
CPC ........ *H04W 40/22* (2013.01); *H04B 7/18504* (2013.01); *H04B 7/18506* (2013.01); *H04W 24/02* (2013.01); *H04W 24/08* (2013.01); *H04W 76/14* (2018.02)

(58) Field of Classification Search
None
See application file for complete search history.

(56) References Cited

U.S. PATENT DOCUMENTS

| 2010/0014444 A1* | 1/2010 | Ghanadan ............. H04W 40/26 370/310 |
| 2011/0286325 A1 | 11/2011 | Jalali et al. |
| 2013/0242864 A1 | 9/2013 | Vermande et al. |

FOREIGN PATENT DOCUMENTS

| EP | 2 833 564 A1 | 2/2015 |
| GB | 2 523 644 A | 9/2015 |

OTHER PUBLICATIONS

European Patent Office, Extended European Search Report, EP 17 18 5826 (dated Feb. 23, 2018).
Frommer, "This new satellite tech will finally make your Gogo inflight wifi fast," Quartz (qz.com).
"Iridium GO!" (www.bluecosmo.com/iridium-go).

* cited by examiner

*Primary Examiner* — Zewdu A Beyen
(74) *Attorney, Agent, or Firm* — Walters & Wasylyna LLC

(57) ABSTRACT

A method for managing a wireless communications system may include the steps of: (1) requesting wireless communication links between a plurality of user terminals and an airborne communications relay terminal, (2) designating one of the plurality of user terminals as a primary user terminal to make a direct communication with the relay terminal, (3) designating other ones of the plurality of user terminals as secondary user terminals to make direct communication with the primary user terminal, (4) connecting the primary user terminal directly to the relay terminal, and (5) connecting the secondary user terminals indirectly to the relay terminal through the primary user terminal.

30 Claims, 17 Drawing Sheets

WIRELESS COMMUNICATIONS SYSTEM AND METHOD FOR MANAGING AND OPTIMIZING A WIRELESS COMMUNICATIONS NETWORK

FIELD

The present disclosure is generally related to wireless communications networks and, more particularly, to a wireless communications system for managing and optimizing a wireless communications network including an airborne communications relay terminal and a plurality of user terminals.

BACKGROUND

Modern wireless communications systems depend on aerial communications relay terminals (e.g., a space or air vehicle) to route communications (e.g., transmit and receive information) between ground based base stations and user terminals. These relay terminals may employ a number of signal beams (e.g., RF spot beams) providing a beam pattern that forms a coverage area over a geographic region that may be divided into a plurality of service areas.

These relay terminals often provide services to both mobile and stationary user terminals. These user terminals typically include mobile platforms (e.g., vehicles) or fixed structures having a relatively large antenna that provide connectivity to one or more portable or personal electronic devices used by occupants of the mobile platform or structure. However, when too many user terminals communicate with the same relay terminal or are too close together, the wireless communications links between the relay terminal and the user terminals become congested. As the number of user terminals increases, so does the power and capacity requirements of the relay terminal.

Accordingly, those skilled in the art continue with research and development efforts in the field of wireless communications network management.

SUMMARY

In one embodiment, the disclosed method for managing a wireless communications system may include the steps of: (1) requesting wireless communication links between a plurality of user terminals and an airborne communications relay terminal, (2) designating one of the plurality of user terminals as a primary user terminal to make a direct communication with the relay terminal, (3) designating other ones of the plurality of user terminals as secondary user terminals to make direct communication with the primary user terminal, (4) connecting the primary user terminal directly to the relay terminal, and (5) connecting the secondary user terminals indirectly to the relay terminal through the primary user terminal.

In another embodiment, the disclosed method for optimizing a wireless communications network may include the steps of: (1) establishing a wireless communications link between a first user terminal and an airborne communications relay terminal, (2) requesting, from a second user terminal, communications with the relay terminal through the first user terminal, and (3) one of granting and denying a communications request between the second user terminal and the relay terminal through the first user terminal.

In yet another embodiment, the disclosed wireless communications system may include an airborne communications relay terminal providing communications coverage over a coverage area, a plurality of user terminals located within the coverage area, and RF equipment distributed among the relay terminal and the plurality of user terminals, the RF equipment includes a control unit configured to: request wireless communication links between the plurality of user terminals and the relay terminal, designate one of the plurality of user terminals as a primary user terminal to make a direct communication with the relay terminal, designating other ones of the plurality of user terminals as secondary user terminals to make direct communication with the primary user terminal, connect the primary user terminal directly to the relay terminal, and connect the secondary user terminals indirectly to the relay terminal through the primary user terminal.

Other embodiments of the disclosed apparatus and method will become apparent from the following detailed description, the accompanying drawings and the appended claims.

DETAILED DESCRIPTION

Figure 1:
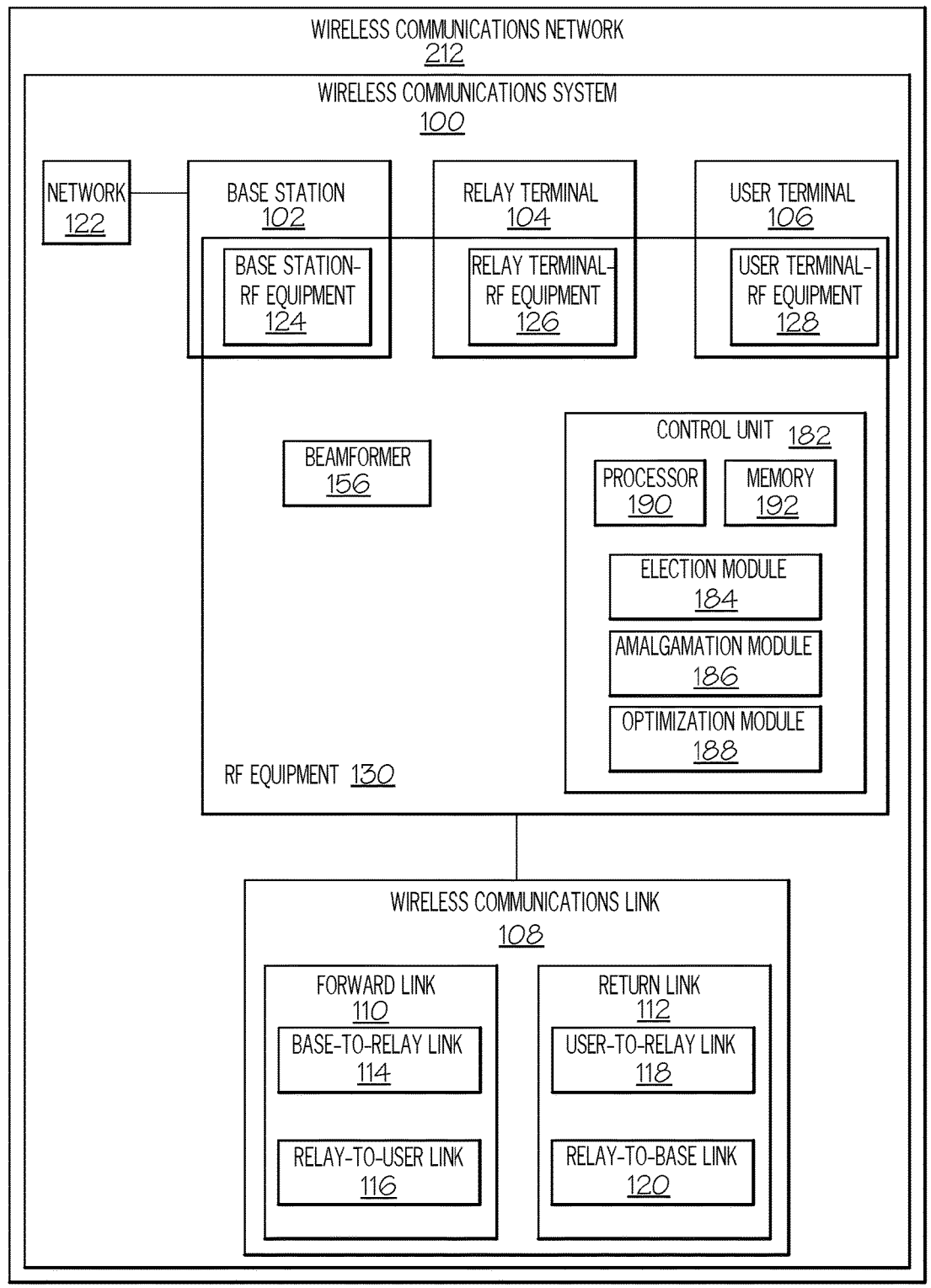
FIG. 1 is a schematic block diagram of one embodiment of the disclosed wireless communications system.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive embodiments, which may be, but are not necessarily, claimed, of the subject matter according the present disclosure are provided below.

FIG. 1 is a schematic block diagram of one embodiment of the disclosed wireless communications system 100. In an exemplary embodiment, the wireless communications system 100 includes at least one base station 102, at least one airborne (e.g., high altitude or orbital) communications relay terminal, generally referred to herein as a relay terminal 104, and at least one user terminal 106. The wireless communications system 100 may be utilized to establish and manage a wireless communications network 212, for example, that includes at least one network 122, at least one base station 102, at least one relay terminal 104, and at least one user terminal 106.

In the exemplary embodiment, the wireless communications system 100 includes radio frequency (RF) equipment 130. The RF equipment 130 establishes and controls a wireless communications link 108 between the base station 102, the relay terminal 104 and the user terminal 106. In an exemplary embodiment, the RF equipment 130 is configured to generate, transmit, receive and/or process RF signals in order to communicate data or other information wirelessly between the base station 102 and the user terminal 106 via the relay terminal 104.

In various embodiments, the RF equipment 130 may be distributed among, or implemented in full or in part by, the base station 102, the relay terminal 104 and/or the user terminal 106. For example, the RF equipment 130 may include base station-RF equipment 124 located on (e.g., integrated with) or implemented by the base station 102. The RF equipment 130 may also include relay terminal-RF equipment 126 located on (e.g., integrated with) or implemented by the relay terminal 104. The RF equipment 130 may also include user terminal-RF equipment 128 located on (e.g., integrated with) or implemented by the user terminal 106.

The wireless communications link 108 includes a forward link 110 and a return link 112. The forward link 110, also referred to as a downlink, is a communications path for the wireless transmission of data from the base station 102 to the user terminal 106. The return link 112, also referred to as an uplink, is a communications path for the wireless transmission of data from the user terminal 106 to the base station 102.

The wireless communications system 100 may include a plurality of forward links 110 transmitting data from one or more base stations 102 to a plurality of user terminals 106 and/or a plurality of return links 112 transmitting data from a plurality of user terminals 106 to one or more base stations 102. In an exemplary embodiment, the forward link 110 transmits data from one or more of the base stations 102 through one or more of the relay terminals 104 and to one or more of the user terminals 106. Similarly, the return link 112 transmits data from one or more of the user terminals 106 through one or more of the relay terminals 104 to one or more of the base stations 102. In this manner, the terms downlink and uplink are used in reference to the user terminal 106.

As an example, the forward link 110 includes one or more base-to-relay (BTR) links 114. The BTR link 114 is a communications path for the wireless transmission of data from the base station 102 to the relay terminal 104. In this example, the forward link 110 also includes one or more relay-to-user (RTU) links 116. The RTU link 116 is a communications path for the wireless transmission of data from the relay terminal 104 to the user terminal 106.

Conversely, as another example, the return link 112 includes one or more user-to-relay (UTR) links 118. The UTR link 118 is a communications path for the wireless transmission of data from the user terminal 106 to the relay terminal 104. In this example, the return link 112 also includes one or more relay-to-base (RTB) links 120. The RTB link 120 is a communications path for the wireless transmission of data from the relay terminal 104 to the base station 102.

As an example implementation, one or more of the base stations 102 (e.g., each base station 102) communicates with one or more of the relay terminals 104 (e.g., each relay terminal 104) over the respective BTR link 114. One or more of the relay terminals 104 (e.g., each relay terminal 104) communicates with one or more of the user terminals 106 (e.g., each user terminal 106) over the respective RTU link 116. Similarly, one or more of the user terminals 106 (e.g., each user terminal 106) communicates with one or more of the relay terminals 104 (e.g., each relay terminal 104) over the respective UTR link 118. One or more of the relay terminals 104 (e.g., each relay terminal 104) communicates with one or more of the base stations 102 (e.g., each base station 102) over the respective RTB link 120.

Referring still to FIG. 1, in the exemplary embodiment, the RF equipment 130 includes a beamformer 156. The beamformer 156 is configured to control directional signal transmission and/or reception of the RF signals. As an example, the beamformer 156 controls the phase and/or relative amplitude of the RF signal in order to create a pattern of constructive and destructive interference in the wavefront. In various embodiments, the beamformer 156 may be distributed among, or implemented in full or in part by, the base station 102, the relay terminal 104 and/or the user terminal 106.

As an example, the base station-RF equipment 124 is be configured to transmit a directional (e.g., a high gain) RF signal, for example, as an RF beam, directed at the relay terminal 104 to which the base station 102 is communicating. As another example, the relay terminal-RF equipment 126 is configured to transmit a directional (e.g., a high gain) RF signal, for example, as an RF beam, directed at the user terminal 106 and/or the base station 102 to which the relay terminal 104 is communicating. As yet another example, the user terminal-RF equipment 128 is configured to transmit an omni-directional RF signal or a directional RF signal, which is received by the relay terminal 104 to which the user terminal 106 is communicating.

In the exemplary embodiment, the RF equipment 130 also includes a communications control unit 182. The control unit 182 includes a computing device configured to control implementation of the wireless communications link 108. In particular, the control unit 182 is configured to control implementation of the RTU link 116 and the UTR link 118 between a plurality of user terminals 106 and one or more relay terminals 104. As an example, the control unit 182 is configured to establish a virtual cell that provides wireless communications services to a selected plurality of user terminals 106.

As will be described in more detail below, in this example, the control unit 182 includes an election module 184, an amalgamation module 186 and an optimization module 188. The election module 184 is configured to designate one of the plurality of user terminals 106 as a primary user terminal for direct communications with the relay terminal 104 and designate at least one other one of the plurality of user terminals 106 as a secondary user terminal that communicates with the relay terminal 104 through the primary user terminal. The amalgamation module 186 is configured to combine and control distribution of data between (e.g., to and from) one or more relay terminals 104 and the plurality of user terminals 106. The optimization module 188 is configured to determine which ones of and how many of the plurality of user terminals 106 communicate with the relay terminal 104.

The control unit 182 includes a processor 190 and memory 192. The processor 190 is any suitably programmed computer processor configured to run instructions, for example, loaded onto the memory 192. The processor 190 may be a number of processors, a multi-processor core, or any other type of processor, depending upon the particular implementation of the control unit 182. The memory 192 includes any device capable of storing information. Information may include, but is not limited to, data, program code in functional form, and other suitable information either on a temporary or permanent basis. The memory 192 may also be referred to as a non-transitory computer-readable storage medium.

Figure 16A:
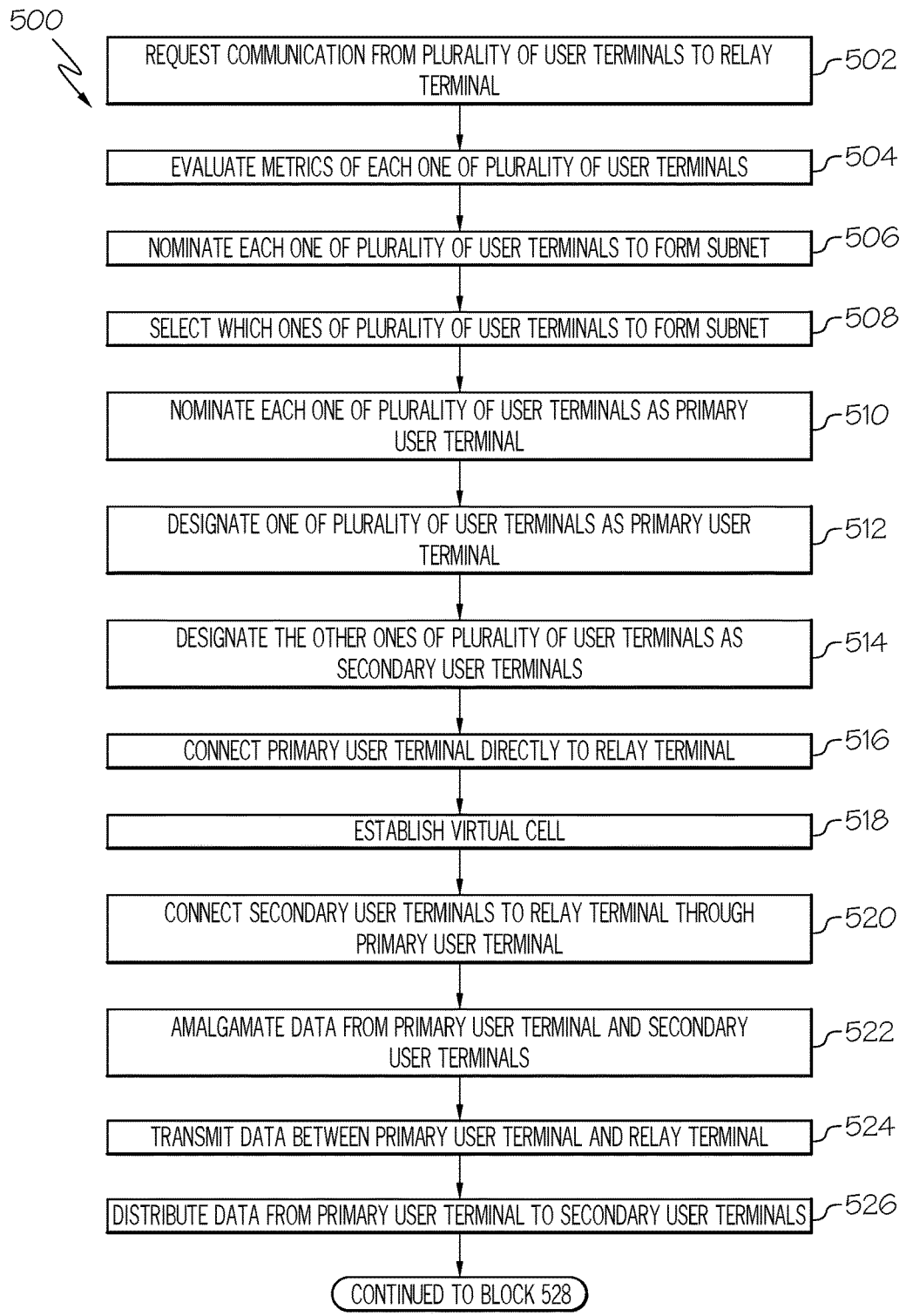
FIG. 16A is a first portion of a flow diagram of one embodiment of the disclosed method for managing a wireless communications network.
Figure 16B:
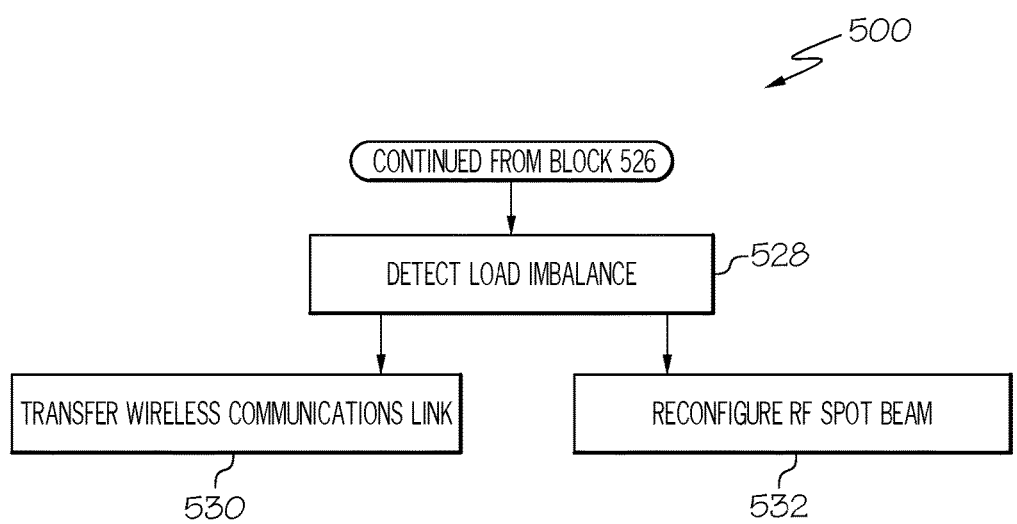
FIG. 16B is a second portion of the flow diagram of the disclosed method for managing the wireless communications network.
Figure 17A:
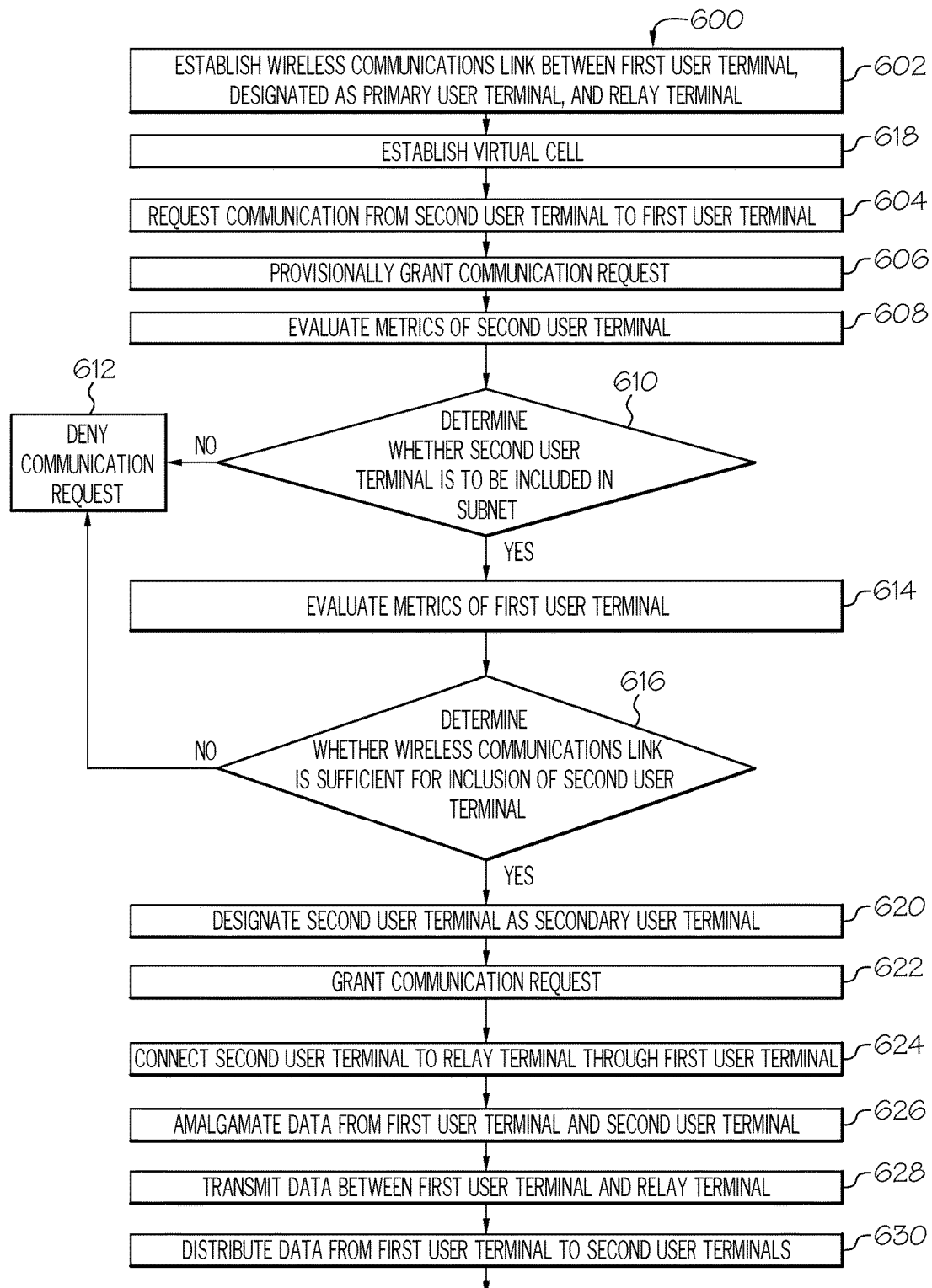
FIG. 17A is a first portion of a flow diagram of one embodiment of the disclosed method for optimizing the wireless communications network.
Figure 17B:
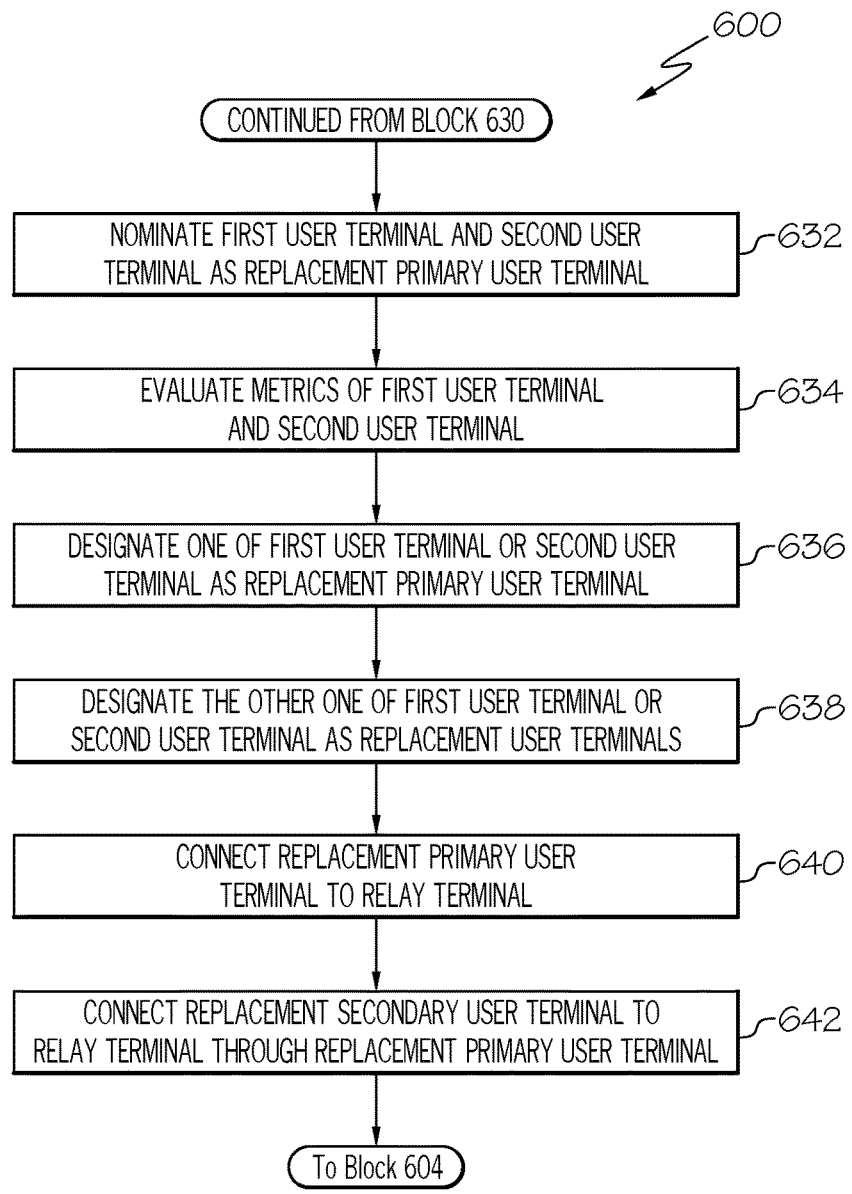
FIG. 17B is a second portion of the flow diagram of the disclosed method for optimizing the wireless communications network.

For example, the disclosed method 500 (FIGS. 16A and 16B) and/or method 600 (FIGS. 17A and 17B) and/or portions thereof may be implemented as or utilize a computer program product that includes a non-transitory computer readable memory medium and computer controlling instructions stored on the non-transitory computer readable memory medium that is executed by a computer processor, such as the computer processor 190 of the control unit 182.

Examples of the disclosed system 100 and/or control unit 182 may also include one or more data stores, input devices, output devices, and a network interface. A bus system, including, for example, a data bus and a motherboard, can be used to establish and control data communication between the components of the system 100. Other system architectures can also be used.

The processor 190 may, for example, include one or more microprocessors. The data store may, for example, include a random access memory storage device, such as a dynamic random access memory, one or more hard drives, a flash memory, and/or a read only memory or other types of computer-readable medium memory devices.

Thus, various implementations of the systems, methods and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As with the other components of the RF equipment 130, the control unit 182 may be distributed among, or implemented in full or in part by, the base station 102, the relay terminal 104 and/or the user terminal 106.

Figure 2:
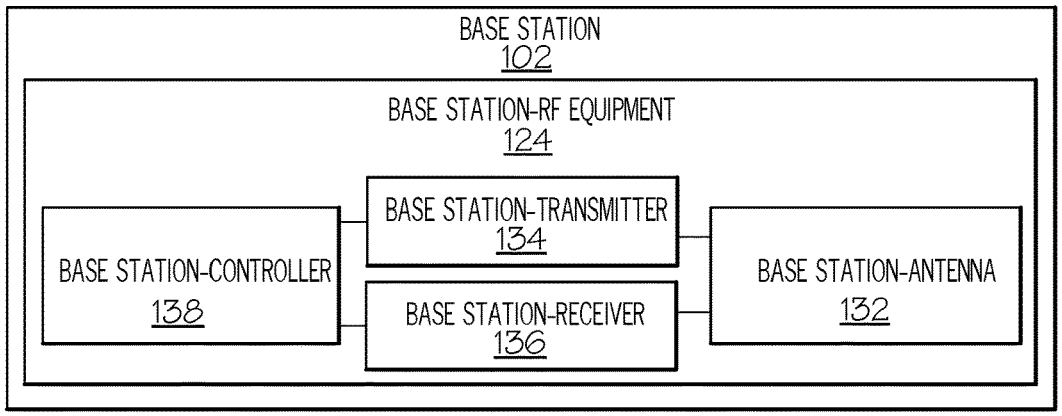
FIG. 2 is a schematic block diagram of one embodiment of a base station of the disclosed wireless communications system.

FIG. 2 is a schematic block diagram of an exemplary embodiment of the base station 102. The base station 102 is a ground-based base station, also commonly referred to as a ground station, a gateway or a teleport. A plurality of base stations 102 may be geographically separated (e.g., spaced apart from one another). The base station 102 may be one or more of audio, video and/or data service providers. As an example, base station 102 is an Internet service provider. As other examples, the base station 102 is a telephone, voice and/or data service provider. As yet other examples, the base station 102 is a television, video and/or audio broadcaster.

Referring briefly to FIG. 1, in the exemplary embodiment, the base station 102 is coupled to or otherwise part of a terrestrial network 122 (FIG. 1). As an example, the network 122 includes a telecommunications network, such as the Internet. Thus, the base station 102 may provide connectivity between the user terminal 106 and the network 122 through the relay terminal 104.

Referring back to FIG. 2, in the exemplary embodiment of the base station 102, the base station-RF equipment 124 includes one or more base station-antenna 132. The base station-antenna 132 is configured to transmit RF signals (e.g., a carrier wave modulated with an input signal) to one or more of the relay terminals 104 (e.g., over the BTR link 114) (FIG. 1). Conversely, the base station-antenna 132 is configured to receive RF signals from one or more of the relay terminals 104 (e.g., over the RTB link 120) (FIG. 1).

The base station-antenna 132 may include a separate transmit antenna and receive antenna (e.g., one or more antenna elements configured to transmit and one or more antenna elements configured to receive). Alternatively, the base station-antenna 132 may include a combined transmit/receive antenna (e.g., one or more antenna elements configured to transmit and receive). As examples, the base station-antenna 132 is one or more of a horn antenna, an analog phased array, a digital phased array, a reflector antenna and the like.

In the exemplary embodiment of the base station 102, the base station-RF equipment 124 includes a base station-transmitter 134 and a base station-receiver 136 coupled to the base station-antenna 132. While the illustrated embodiment depicts the base station-transmitter 134 and the base station-receiver 136 as separate elements, in other embodiments, the base station-transmitter 134 and the base station-receiver 136 are integrated as a single transceiver.

In the exemplary embodiment of the base station 102, the base station-RF equipment 124 also includes or is operatively coupled to a base station-controller 138. The base station-controller 138 is configured to control the communication of RF signals and/or data transmitted to the relay terminal 104 and/or the network 122 with which the base station 102 is communicating. The base station-controller 138 is also configured to control the communication of RF signals and/or data received from the relay terminal 104 and/or the network 122 with which the base station 102 is communicating. The base station-controller 138 may be remotely located with or co-located with (e.g., integral to) the base station 102.

The base station-RF equipment 124 may also include a steering device (not explicitly illustrated). The steering device is configured to control a pointing direction of the RF signal, for example, by steering the RF beam. The steering device may include a mechanical beam-director (e.g., a gimbal mechanism) to mechanically steer the RF beam, an electronic beam-director (e.g., a phase shifter) to electronically steer the RF beam, or a combination of mechanical and electronic beam-directors.

Figure 3:
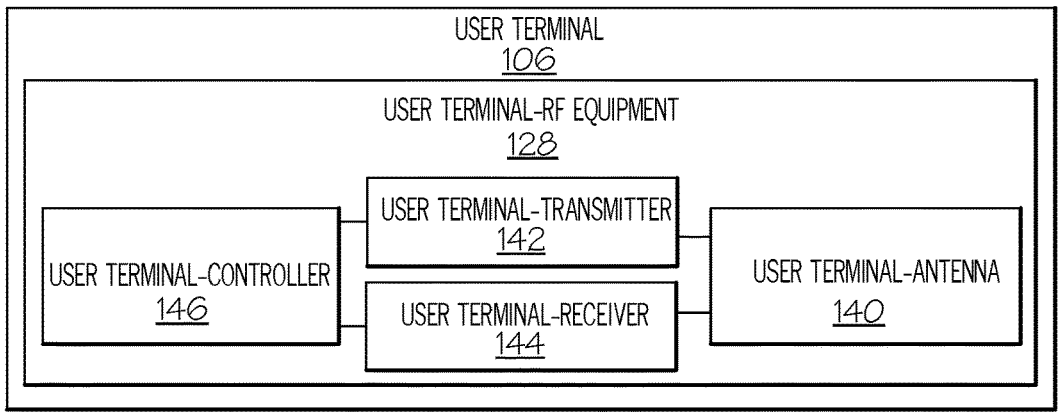
FIG. 3 is a schematic block diagram of one embodiment of a user terminal of the disclosed wireless communications system.

FIG. 3 is a schematic block diagram of an exemplary embodiment of the user terminal 106. The user terminal 106 may be one of any of a variety of different types. The user terminal 106 may be mobile or stationary (e.g., at a fixed location). As examples, the user terminals 106 may include small-sized terminals (e.g., handheld terminals, mobile telephones, etc.), medium-sized terminals (e.g., portable terminals, vehicular terminals, etc.) and/or large-sized terminals (e.g., aeronautic terminals, tower terminals, maritime terminals, etc.).

Figure 5:
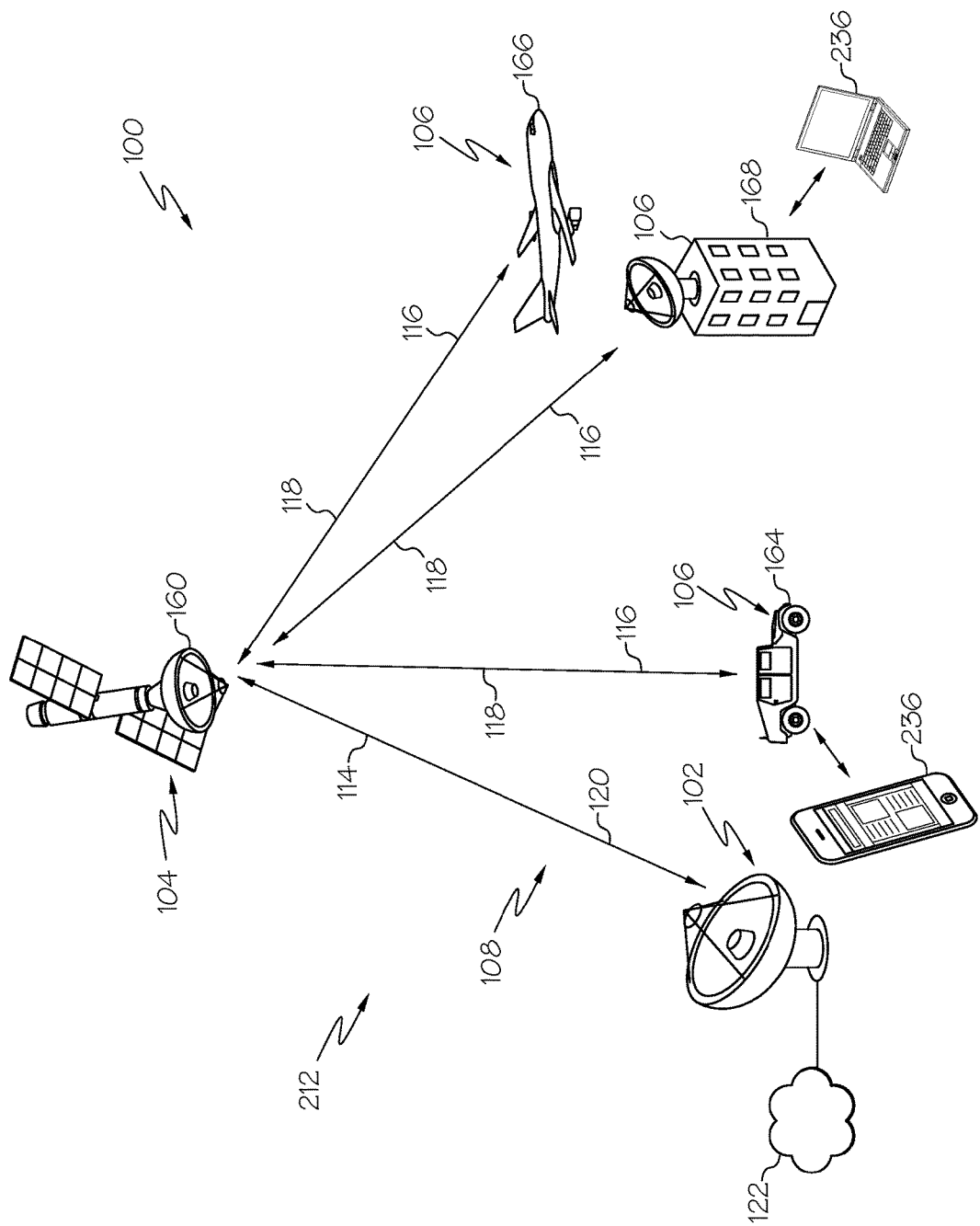
FIG. 5 is a schematic illustration of one example of the disclosed wireless communications system.

FIG. 5 is a schematic illustration of one example of the disclosed wireless communications system 100. As examples, the user terminal 106 may be an RF communications component of a ground-based mobile platform 164 (e.g., an automobile or other vehicle), an airborne mobile platform 166 (e.g., an airplane or other aircraft) or other mobile platform that supports (e.g., carries) the user terminal-RF equipment 128. The user terminal 106 (e.g., the user terminal-RF equipment 128) may service, for example, wirelessly, one or more electronic devices or terminals, herein generally referred to as connected devices 236 (e.g., a cellular telephone, a tablet computer, a personal computer and the like), for example, belonging to occupants of the automobile, the aircraft or other mobile platform.

As another example, the user terminal 106 may be an RF communications component of a structure 168 (e.g., a building, a pole, a tower and the like) that supports the user terminal-RF equipment 128. The user terminal 106 (e.g., the user terminal-RF equipment 128) may service, for example, wired or wirelessly, one or more user devices 236, for example, belonging to occupants of the structure 168. In other words, the user terminal 106 includes any RF communications device or equipment used to provide data communications service to an end user (e.g., an audio, video, or data communications).

Referring back to FIG. 3, in the exemplary embodiment of the user terminal 106, the user terminal-RF equipment 128 includes one or more user terminal-antenna 140. The user terminal-antenna 140 is configured to transmit RF signals (e.g., a carrier wave modulated with an input signal) to one or more of the relay terminals 104 (e.g., over the UTR link 118). Conversely, the user terminal-antenna 140 is configured to receive RF signals from one or more of the relay terminals 104 (e.g., over the RTU link 116).

The user terminal-antenna 140 may include a separate transmit antenna and receive antenna (e.g., one or more antenna elements configured to transmit and one or more antenna elements configured to receive). Alternatively, the user terminal-antenna 140 includes a combined transmit/receive antenna (e.g., one or more antenna elements configured to transmit and receive). The user terminal-antenna 140 may be mounted to the ground-based mobile platform 164, the airborne mobile platform 166 or any other type of vehicle or mobile platform (FIG. 5). Alternatively, the user terminal-antenna 140 may be mounted to the fixed structure 168 (FIG. 5). As examples, the user terminal-antenna 140 is one or more of an omnidirectional antenna, a horn antenna, an analog phased array, a digital phased array, a reflector antenna and the like.

In the exemplary embodiment of the user terminal 106, the user terminal-RF equipment 128 includes a user terminal-transmitter 142 and a user terminal-receiver 144 coupled to the user terminal-antenna 140. While the illustrated embodiment depicts the user terminal-transmitter 142 and the user terminal-receiver 144 as separate elements, in other embodiments, the user terminal-transmitter 142 and the user terminal-receiver 144 are integrated as a single transceiver.

In the exemplary embodiment of the user terminal 106, the user terminal-RF equipment 128 also includes or is operatively coupled to a user terminal-controller 146. The user terminal-controller 146 is configured to control the communication of RF signals and/or data transmitted to the relay terminal 104 with which the user terminal 106 is communicating. The user terminal-controller 146 is also configured to control the communication of RF signals and/or data received from the relay terminal 104 with which the user terminal 106 is communicating. The user terminal-controller 146 may be co-located with (e.g., integral to) the user terminal 106.

Figure 4:
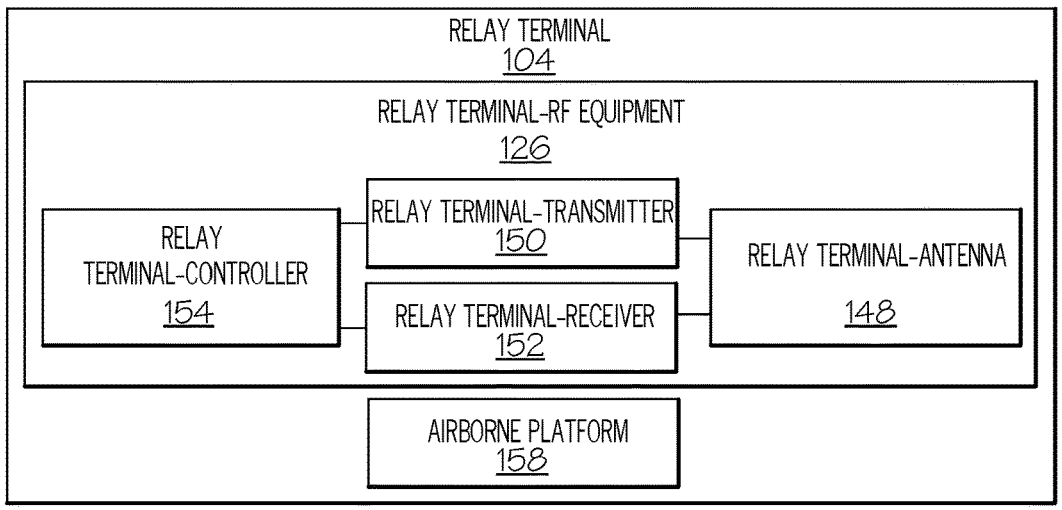
FIG. 4 is schematic block diagram of one embodiment of an airborne communications relay terminal of the disclosed wireless communications system.

FIG. 4 is a schematic block diagram of an exemplary embodiment of the relay terminal 104. The relay terminal-RF equipment 126 includes one or more relay terminal-antenna 148. The relay terminal-antenna 148 is configured to transmit RF signals (e.g., a carrier wave modulated with an input signal) to one or more of the user terminals 106 (e.g., over the RTU link 116) (FIG. 1) and/or transmit RF signals to one or more of the base stations 102 (e.g., over the RTB link 120) (FIG. 1). Conversely, the relay terminal-antenna 148 is configured to receive RF signals from one or more of the base stations 102 (e.g., over the BTR link 114) (FIG. 1) and/or receive RF signals from one or more of the user terminals 106 (e.g., over the UTR link 118) (FIG. 1).

The relay terminal-antenna 148 may include a separate transmit antenna and receive antenna (e.g., one or more antenna elements configured to transmit and one or more antenna elements configured to receive). Alternatively, the relay terminal-antenna 148 may include a combined transmit/receive antenna (e.g., one or more antenna elements configured to transmit and receive). The relay terminal-antenna 148 may be one or more of an analog phased array, a digital phased arrays, a reflector antenna and the like. As an example, relay terminal-antenna 148 includes a plurality of the antenna elements arranged in a linear array or a planar array.

In the exemplary embodiment of the relay terminal 104, the relay terminal-RF equipment 126 includes a relay terminal-transmitter 150 and a relay terminal-receiver 152 coupled to the relay terminal-antenna 148. While the illustrated embodiment depicts the relay terminal-transmitter 150 and the relay terminal-receiver 152 as separate elements, in other embodiments, the relay terminal-transmitter 150 and the relay terminal-receiver 152 are integrated as a single transceiver.

In the exemplary embodiment of the relay terminal 104, the relay terminal-RF equipment 126 also includes or is operatively coupled to a relay terminal-controller 154. The relay terminal-controller 154 is configured to control the communication of RF signals and/or data transmitted to the base station 102 and/or the user terminal 106 with which the relay terminal 104 is communicating. The relay terminal-controller 154 is also configured to control the communication of RF signals and/or data received from the base station 102 and/or the user terminal 106 with which the relay terminal 104 is communicating. The relay terminal-controller 154 may be remotely located with or co-located onboard (e.g., integral to) the relay terminal 104.

The relay terminal-RF equipment 126 may also include a steering device (not explicitly illustrated). The steering device is configured to control a pointing direction of the RF signal, for example, by steering the RF beam. The steering device may include a mechanical beam-director (e.g., a gimbal mechanism) to mechanically steer the RF beam, an electronic beam-director (e.g., a phase shifter) to electronically steer the RF beam, or a combination of mechanical and electronic beam-directors.

In the exemplary embodiment, the relay terminal 104 also includes a mobile airborne platform 158. The airborne platform 158 is configured to carry the relay terminal-antenna 148 and other components of the relay terminal-RF equipment 126 (e.g., an RF payload).

Referring to FIG. 5, in one example of the disclosed wireless communications system 100, the relay terminal 104 is satellite 160 (e.g., an orbital relay terminal). In this example, a plurality of relay terminals 104 may be referred to as a constellation of satellites 160. As such, the wireless communications system 100 establishes the wireless communications link 108 between one or more base stations 102 (one base station 102 is shown by example), one or more satellites 160 (one satellite 160 is shown by example) and one or more user terminals 106 (three user terminals 106 are shown by example).

The BTR link 114 is a communications path for the wireless transmission of data from the base station 102 to the satellite 160. The RTB link 120 is a communications path for the wireless transmission of data from the satellite 160 to the base station 102. The RTU link 116 is a communications path for the wireless transmission of data from the satellite 160 to the user terminal 106. The UTR link 118 is a communications path for the wireless transmission of data from the user terminal 106 to the satellite 160.

Generally, the satellite 160 is any orbital platform that orbits around the Earth and is configured to transmit and/or receive RF communications to and/or from the base station 102 and/or the user terminal 106. As an example, the satellite 160 is in geostationary orbit. As another example, the satellite 160 is in geosynchronous orbit. As another example, the satellite 160 is in low Earth orbit (LEO). As another example, the satellite 160 is in high Earth orbit (HEO). As another example, the satellite 160 is in medium Earth orbit (MEO). As yet another example, the satellite 160 is in Molniya orbit.

As a specific, non-limiting example, the satellite 160 is a high-throughput satellite (HTS). As such, the satellite 160 may be configured to transmit and/or receive radio waves covering a microwave frequency range between approximately 1.0 GHz and approximately 90 GHz.

Figure 6:
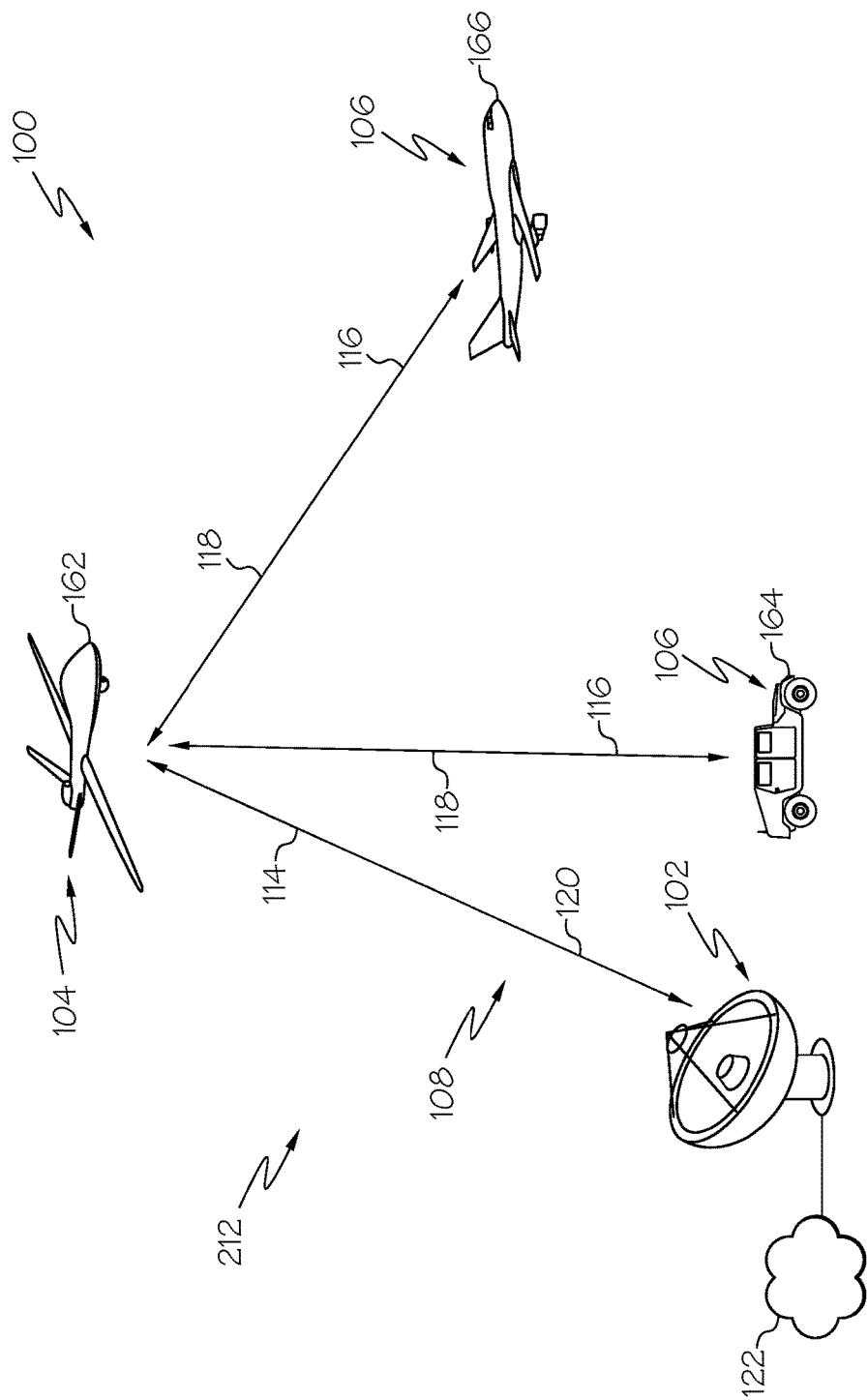
FIG. 6 is a schematic illustration of another example of the disclosed wireless communications system.

FIG. 6 is a schematic illustration of another example of the disclosed wireless communications system 100. In this example, the relay terminal 104 is a high altitude aerial vehicle 162 (e.g., a high altitude relay terminal). In this example, a plurality of relay terminals 104 may be referred to as a collection of aerial vehicles 162. As such, the wireless communications system 100 establishes the wireless communications link 108 between one or more base stations 102 (one base station 102 is shown by example), one or more aerial vehicles 162 (one aerial vehicle 162 is shown by example) and one or more user terminals 106 (two user terminals 106 are shown by example).

The BTR link 114 is a communications path for the wireless transmission of data from the base station 102 to the aerial vehicle 162. The RTB link 120 is a communications path for the wireless transmission of data from the aerial vehicle 162 to the base station 102. The RTU link 116 is a communications path for the wireless transmission of data from the aerial vehicle 162 to the user terminal 106. The UTR link 118 is a communications path for the wireless transmission of data from the user terminal 106 to the aerial vehicle 162.

Generally, the aerial vehicle 162 is any aerial platform that operates (e.g., flies) at a high altitude over the Earth and is configured to transmit and/or receive RF communications to and/or from the base station 102 and/or the user terminal 106. The aerial vehicle 162 may fly in a predetermined flight path over a given geographic area on Earth, such as over one or more base stations 102 and/or one or more user terminals 106.

The aerial vehicle 162 is assigned to fly within the flight path. The flight path may vary or may remain unchanged. As examples, the flight path may be a circular path, a nearly circular path or an elliptical path. Alternatively, as other examples, the flight path may be a series of two or more intersecting or adjoining nearly circular or elliptical paths. As one specific example, the flight path may be maintained having a major dimension (e.g., a diameter) of between approximately 1 km and 5 km.

The aerial vehicle 162 operates within a minimum altitude and a maximum altitude. As an example, the aerial vehicle 162 operates at an altitude of between approximately 39,000 feet (12 km) and approximately 180,000 feet (55 km) (e.g., the stratosphere). As another example, the aerial vehicle 162 operates at an altitude of between 55,000 feet (16 km) and approximately 164,000 feet (50 km). As another example, the aerial vehicle 162 operates at an altitude of approximately 65,000 feet (20 km). As yet another example, the aerial vehicle 162 operates at an altitude of at least approximately 65,000 feet (20 km).

As a general example, the aerial vehicle 162 is an unmanned aerial vehicle (UAV). The aerial vehicle 162 may be capable of flying for long periods of time (e.g., for several months) at the operating altitude. As a specific example, the aerial vehicle 162 is a solar-powered electric UAV. For example, the aerial vehicle 162 is a high-altitude long endurance (HALE) UAV.

Figure 7:
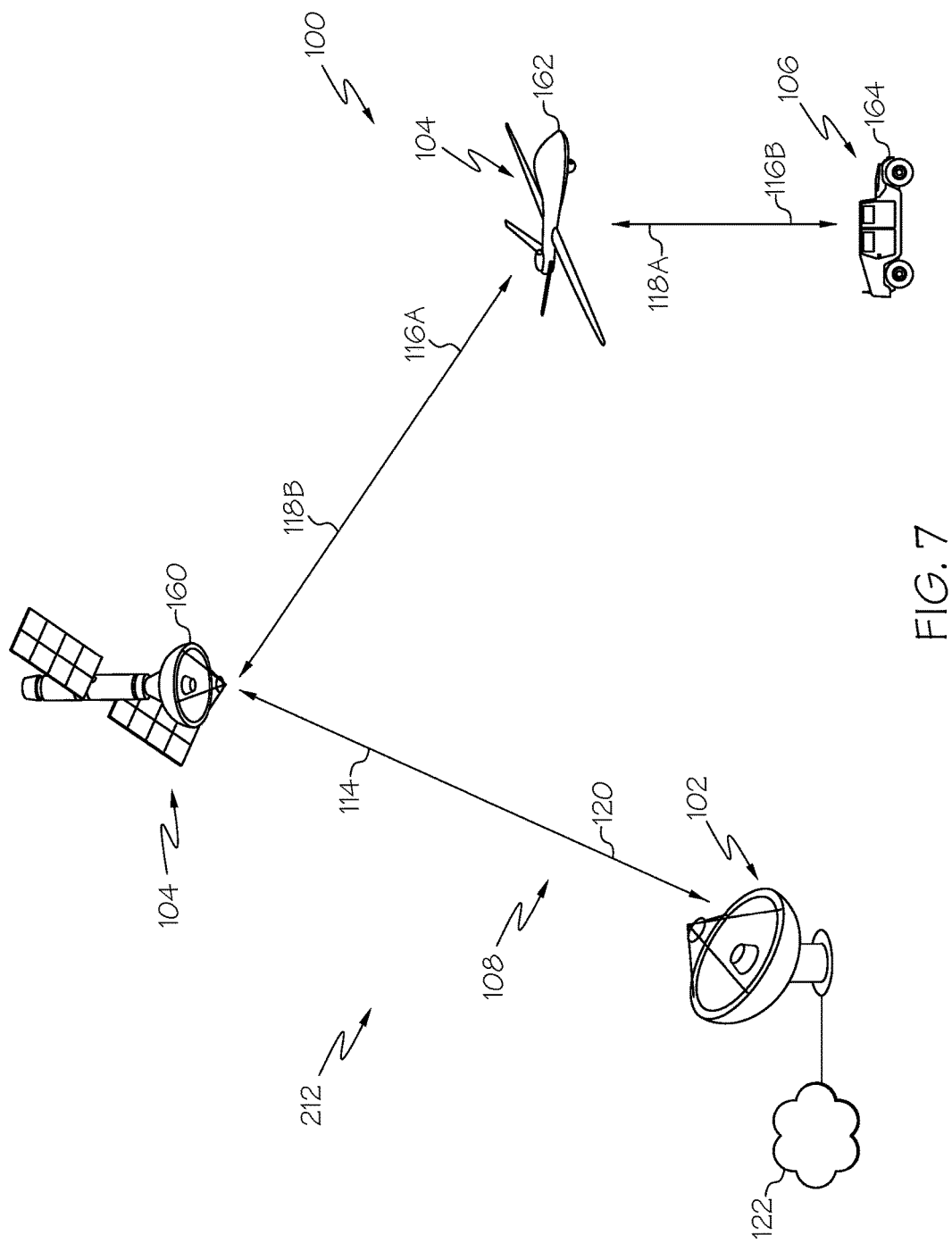
FIG. 7 is a schematic illustration of another example of the disclosed wireless communications system.

FIG. 7 is a schematic illustration of another example of the disclosed wireless communications system 100. In this example, the wireless communications system 100 includes a combination of the satellite 160 and the aerial vehicle 162. As such, the wireless communications system 100 establishes the wireless communications link 108 between one or more base stations 102 (one base station 102 is shown by example), one or more satellites 160 (one satellite 160 is shown by example), one or more aerial vehicles 162 (one aerial vehicle 162 is shown by example) and one or more user terminals 106 (one user terminal 106 is shown by example).

The BTR link 114 is a communications path for the wireless transmission of data from the base station 102 to the satellite 160. The RTB link 120 is a communications path for the wireless transmission of data from the satellite 160 to the base station 102. An RTU link-first portion 116A is a communications path for the wireless transmission of data from the satellite 160 to the aerial vehicle 162. An RTU link-second portion 116B is a communications path for the wireless transmission of data from the aerial vehicle 162 to the user terminal 106. A UTR link-first portion 118A is a communications path for the wireless transmission of data from the user terminal 106 to the aerial vehicle 162. A UTR link-second portion 118B is a communications path for the wireless transmission of data from the aerial vehicle 162 to the satellite 160.

Figure 8:
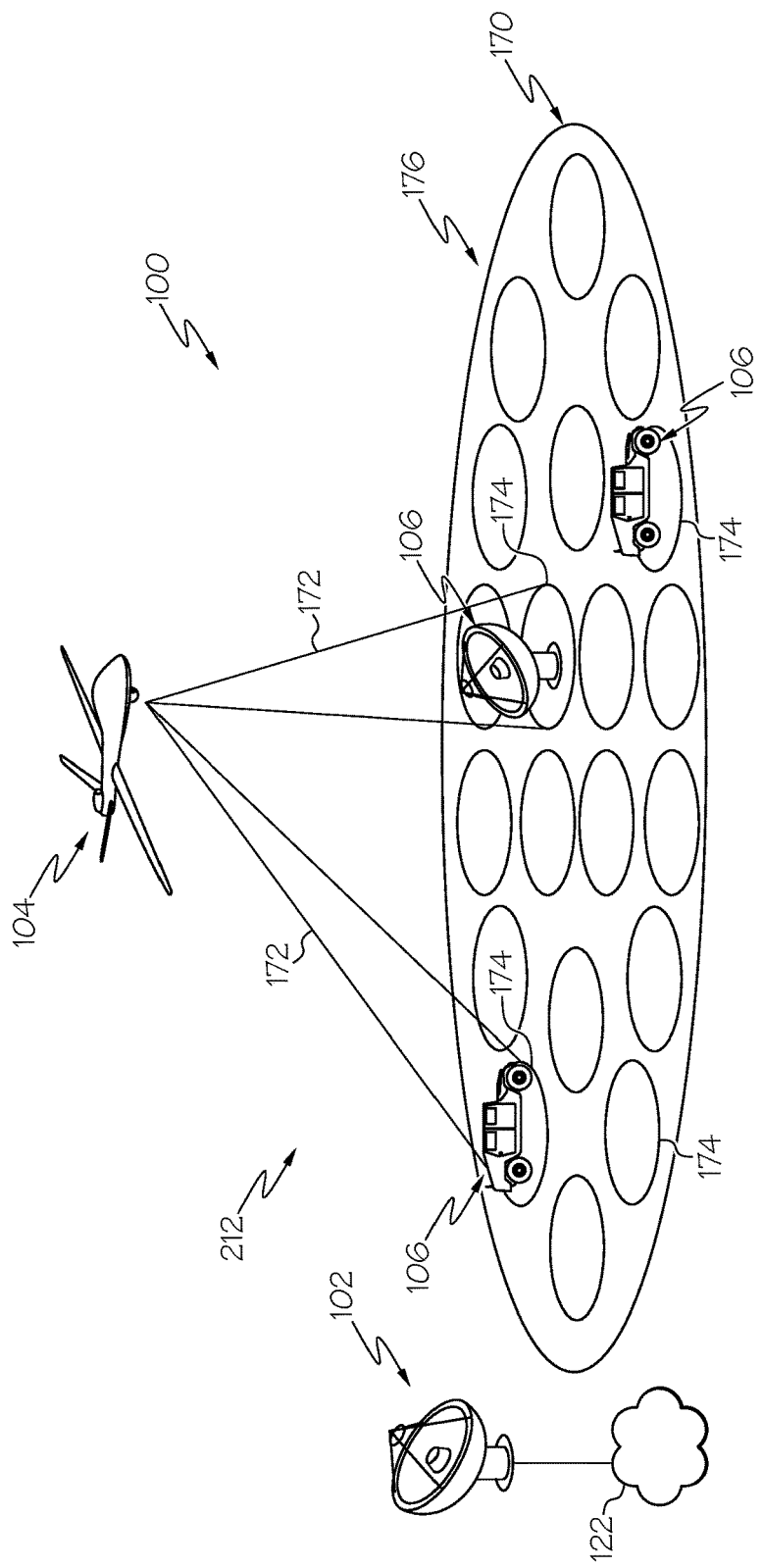
FIG. 8 is a schematic illustration of another example of the disclosed wireless communications system depicting a coverage area.

FIG. 8 is a schematic illustration of another example of the wireless communications system 100. One or more relay terminals 104 (one relay terminal 104 is shown by example) operates or serves as a (e.g., high altitude or orbital) communications relay or node between one or more base stations 102 (one base station 102 is shown by example) and one or more user terminals 106 (three user terminals 106 are shown by example).

The relay terminal 104 covers (e.g., provides communications coverage over) a coverage area 170. As an example, the relay terminal 104 is assigned to fly within the flight path over the coverage area 170. The coverage area 170 may be a geographic region, a metropolitan area, a market area and the like. As one example, the coverage area 170 may include a major dimension (e.g., a diameter) of approximately 40 km.

In various embodiments of the disclosed wireless communications system 100, the base station 102 and the relay terminal 104 enable communication between the user terminal 106 and the network 122 (FIG. 1). In this regard, as one example, the base station 102 receives information (e.g., data) from the network 122, and wirelessly communicates the information to the relay terminal 104. The relay terminal 104 in turn wirelessly transmits or relays the information to one or more of the user terminals 106. Conversely, the relay terminal 104 receives information from one or more of the user terminals 106, and in turn wirelessly communicates the information to the base station 102, which in turn transmits or relays the information to the network 122.

In the exemplary embodiment, the relay terminal 104 employs a plurality of RF spot beams 172, also referred to as an RF beam. The RF spot beam 172 is radiated from the relay terminal 104 to Earth's surface. As one example, the beamformer 156 of the RF equipment 130 (FIG. 1) shapes the RF signal to form the RF spot beam 172. Each RF spot beam 172 has a transmission direction pointing towards the ground and covers a service area defining a ground cell 174. In other words, each one of the ground cells 174 represents a footprint of the shaped RF spot beam 172. The plurality of RF spot beams 172 divides the coverage area 170 into a plurality of ground cells 174 (two RF spot beams 172 and four ground cells 174 are explicitly identified in FIG. 8). The user terminals 106 located within the same ground cell 174 are served by the same RF spot beam 172. Thus, each of the RF spot beams 172 may support one or more RTU links 116 and/or UTR links 118 (FIG. 1).

In the exemplary embodiment, different ones of the RF spot beams 172 operate at the same or different frequencies.

As an example, the operating frequencies of the RF spot beams 172 directed at (e.g., defining) neighboring (e.g., directly adjacent) ground cells 174 are different to prevent frequency interference. Different operating frequencies among neighboring ground cells 174 may also allow some overlap between the neighboring ground cells 174 (e.g., overlap of adjacent or neighboring RF spot beams 172). Thus, the coverage area 170 may be segmented into the plurality of ground cells 174 defined by the plurality of RF spot beams 172 to produce a frequency reuse pattern 176 (e.g., ground pattern), so that the same RF frequencies or channels may be reused within different, non-adjacent ones of the ground cells 174. That is, the relay terminal 104 may reuse the same frequency in different RF spot beams 172.

The ground cells 174, for example, defining the frequency reuse pattern 176 may be static (e.g., not changing in size and/or location) or dynamic (e.g., changing in size and/or location). As an example, the RF spot beams 172 may change size and/or location, for example, due to movement of the relay terminal 104. Thus, the size and/or location of the ground cells 174 defined by the RF spot beams 172 may correspondingly change. As an example, the RF spot beams 172 may not change size and/or location. Thus, the size and/or location of the ground cells 174 defined by the RF spot beams 172 may not change.

A ground-based mobile user terminal 106 (e.g., an automobile) and/or an aerial mobile user terminal 106 (e.g., an aircraft) may be temporarily or permanently located within the coverage area 170. For example, the mobile user terminal 106 may be temporarily located within any one of the ground cells 174 for a period of time. As an example, the mobile user-terminal 106 may switch between different ones of the ground cells 174 in response to a change in location of the user terminal 106 (e.g., as the user terminal 106 travels from one destination to another). As another example, the mobile user terminal 106 may switch between different ones of the ground cells 174 in response to a change in location of the ground cells 174 (e.g., as the relay terminal 104 travels along its flight path or orbit). In either example, an RF signal handover will occur between the two RF spot beams 172. In such an example, the handover is triggered by one of movement of the RF spot beam 172 to a different user terminal 106 or movement of the user terminal 106 to a different RF spot beam 172.

Similarly, a ground-based stationary user terminal 106 (e.g., a structure) may be temporarily or permanently located within the coverage area 170. For example, the stationary user terminal 106 may be temporarily located within any one of the ground cells 174 for a period of time. As an example, the stationary user terminal 106 may switch between different ones of the ground cells 174 in response to a change in location of the ground cells 174 (e.g., as the relay terminal 104 travels along its flight path or orbit). In this example, an RF signal handover will occur between the two RF spot beams 172. In such an example, the handover is triggered by movement of the RF spot beam 172 to a different user terminal 106.

The ground-based base station 102 may be located within or outside of the coverage area 170.

Figure 9:
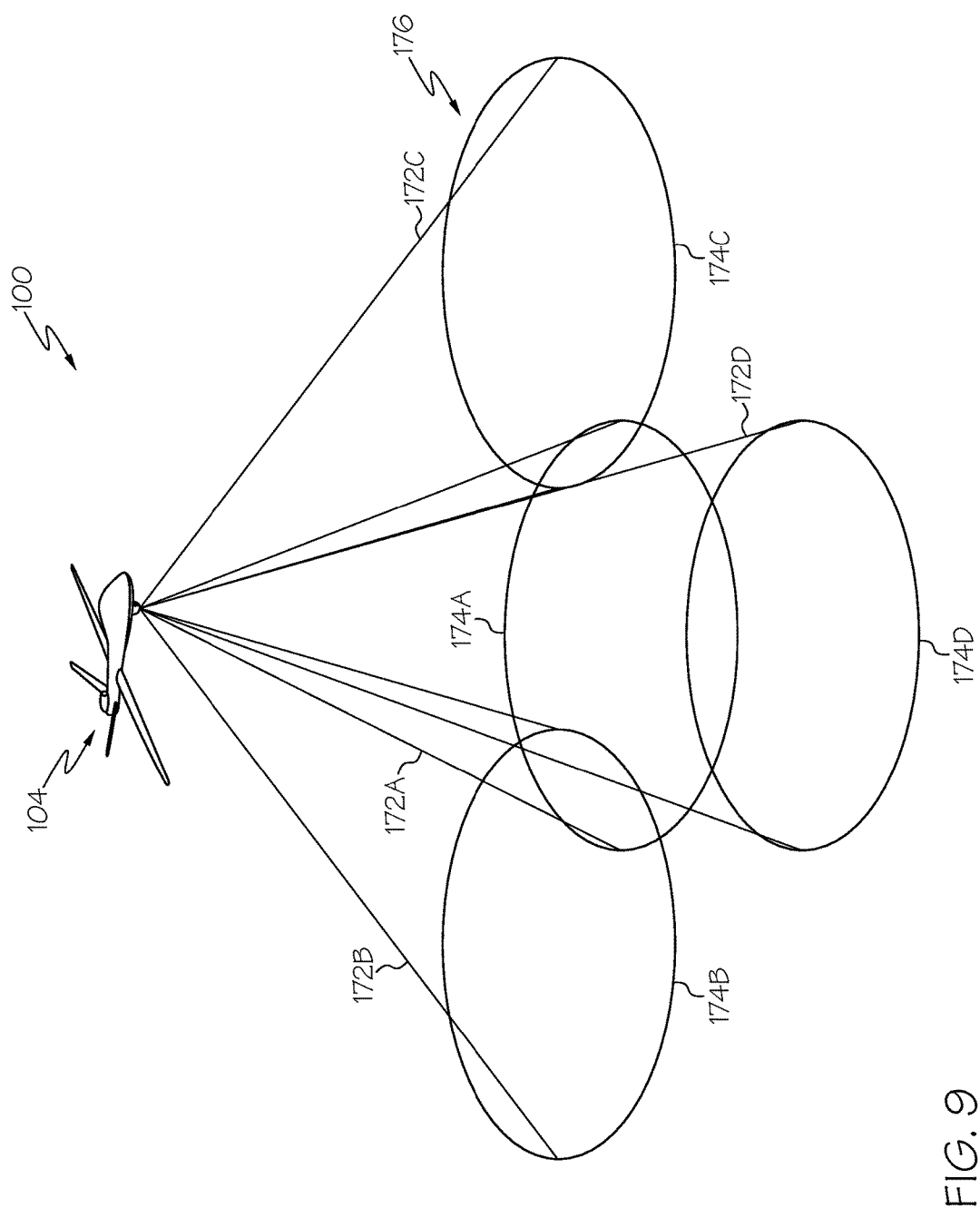
FIG. 9 is a schematic illustration of another example of the disclosed wireless communications system depicting a plurality of ground cells.

FIG. 9 is a schematic illustration of another example of the disclosed wireless communications system 100. In this example, the relay terminal 104 directs a plurality of RF spot beams 172 defining a plurality of ground cells 174, for example, in the frequency reuse pattern 176. As an example, the relay terminal 104 generates and directs a first RF spot beam 172A defining a first ground cell 174A, a second RF spot beam 172B defining a second ground cell 174B, a third RF spot beam 172C defining a third ground cell 174C and a fourth RF spot beam 172D defining a fourth ground cell 174D. While four RF spot beams 172 and four associated ground cells 174 are shown by example in FIG. 9, in other examples, the relay terminal 104 may generate and direct any number of RF spot beams 172 defining any number of associated ground cells 174.

Figure 10:
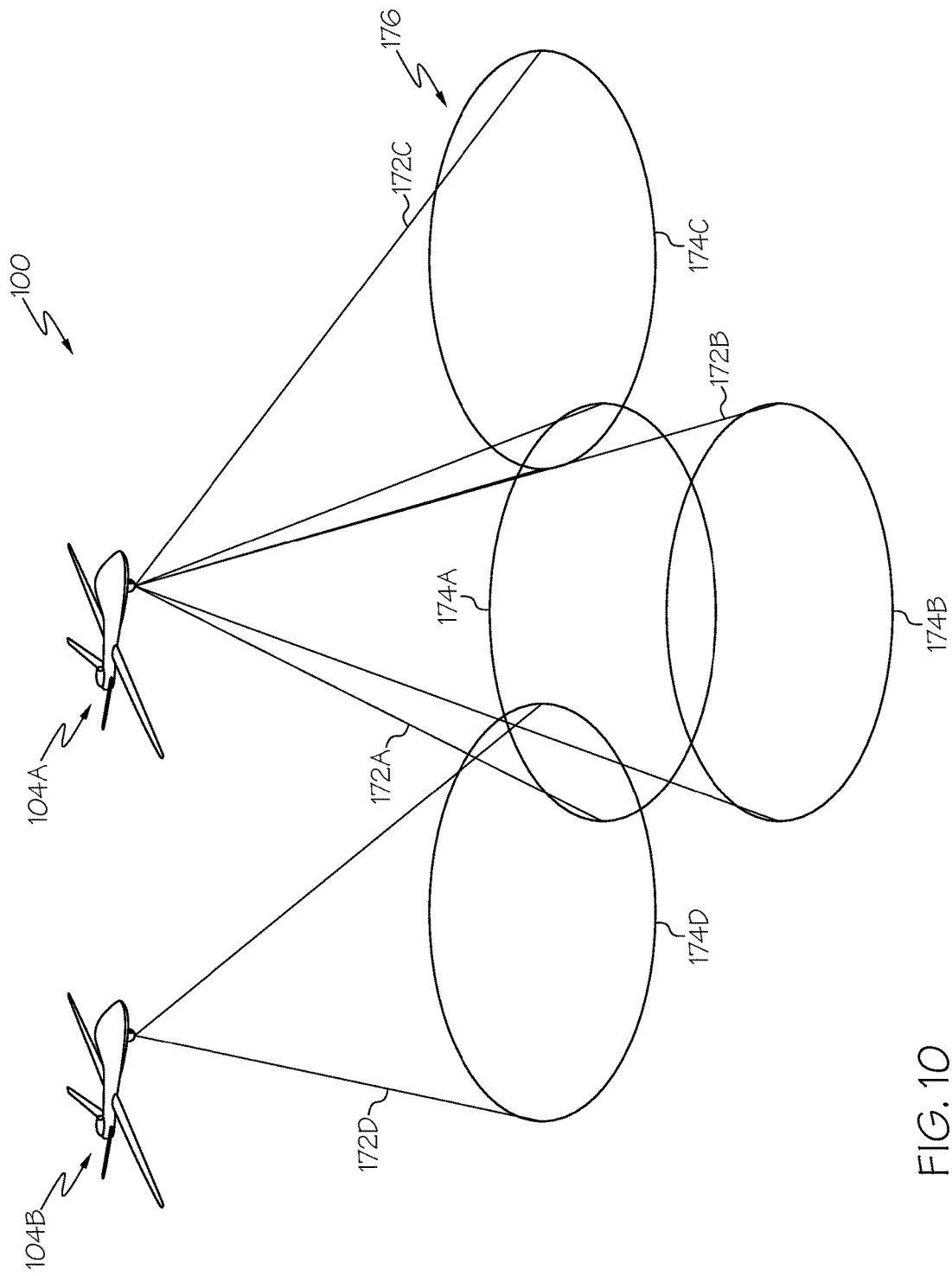
FIG. 10 is a schematic illustration of another example of the disclosed wireless communications system depicting the plurality of ground cells.

FIG. 10 is a schematic illustration of another example of the disclosed wireless communications system 100. In this example, a plurality of relay terminals 104 (two relay terminals 104 are shown by example) directs a plurality of RF spot beams 172 defining a plurality of ground cells 174, for example, in the frequency reuse pattern 176. As an example, a first relay terminal 104A generates and directs the first RF spot beam 172A defining the first ground cell 174A, the second RF spot beam 172B defining the second ground cell 174B, and the third RF spot beam 172C defining the third ground cell 174C. A second relay terminal 104B generates and directs the fourth RF spot beam 172D defining the fourth ground cell 174D. While two relay terminals 104 directing four RF spot beams 172 defining four associated ground cells 174 are shown by example in FIG. 10, in other examples, any number of relay terminals 104 may generate and direct any number of RF spot beams 172 defining any number of associated ground cells 174.

Figure 11:
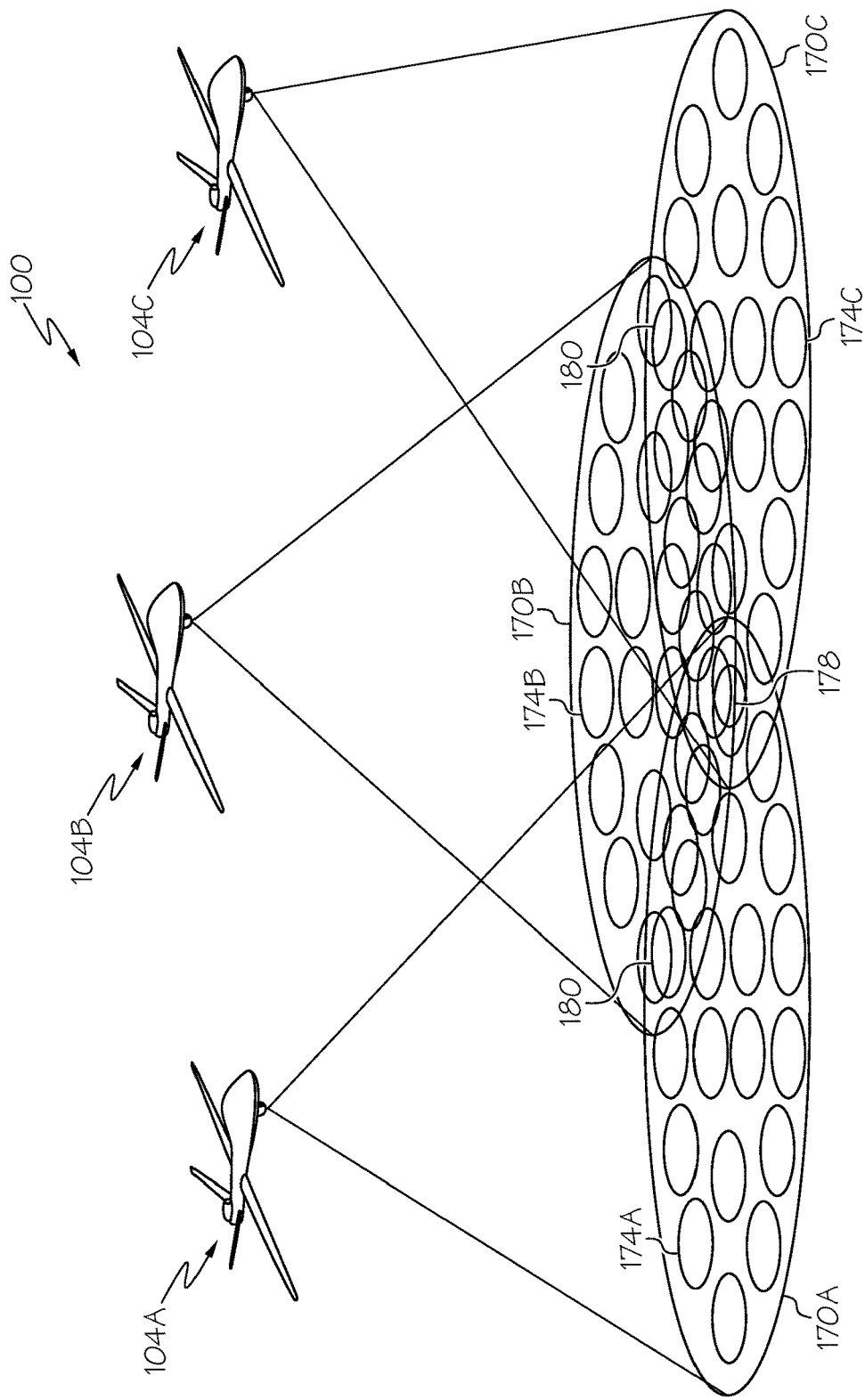
FIG. 11 is a schematic illustration of another example of the disclosed wireless communications system depicting a common coverage area.

FIG. 11 is a schematic illustration of another example of the disclosed wireless communications system 100. In this example, a plurality of relay terminals 104 (e.g., a constellation of satellites or a collection of aerial vehicles) (three relay terminals 104 are shown by example) provides coverage to a plurality of coverage areas 170 (three coverage areas 170 are shown by example). In the illustrated example, a first relay terminal 104A provides coverage to a first coverage area 170A, a second relay terminal 104B provides coverage to a second coverage area 170B, and a third relay terminal 104C provides coverage to a third coverage area 170C. While three relay terminals 104 and three associated coverage areas 170 are shown by example in FIG. 11, in other examples, the plurality of relay terminals 104 may include any number of relay terminals 104 and associated coverage areas 170.

In this example, each one of the relay terminals 104 includes its own associated flight path or orbit, for example, positioning the relay terminal 104 directly over a predetermined position to service the associated coverage area 170. As an example, the plurality of relay terminals 104 are geographically separated, for example, depending upon the overall size of the associated coverage area 170. The plurality of relay terminals 104 may operate at the same orbit or altitude or a different orbits or altitudes.

In this example, each one of the relay terminals 104 directs a plurality of the RF spot beams 172 (FIG. 8) dividing the associated coverage area 170 into the plurality of ground cells 174. As one example, the first coverage area 170A is divided into (e.g., defines) a plurality of first ground cells 174A (one of the first ground cells is explicitly identified). The second coverage area 170B is divided into (e.g., defines) a plurality of second ground cells 174B (one of the second ground cells is explicitly identified). The third coverage area 170C is divided into (e.g., defines) a plurality of third ground cells 174C (one of the third ground cells is explicitly identified).

In this example, at least portions of two or more of the coverage areas 170 overlap to cover the same area and form one or more common coverage areas 178. Thus, the common coverage area 178 includes a service area shared by two or more coverage areas 170. In the illustrated example, overlapping portions of the first coverage area 170A, the second coverage area 170B and the third coverage area 170C form the common coverage area 178. Other common coverage areas (not explicitly identified) are also formed, for example, by overlapping portions of the first coverage area 170A and the second coverage area 170B, overlapping portions of the first coverage area 170A and the third coverage area 170C, etc.

Figure 12:
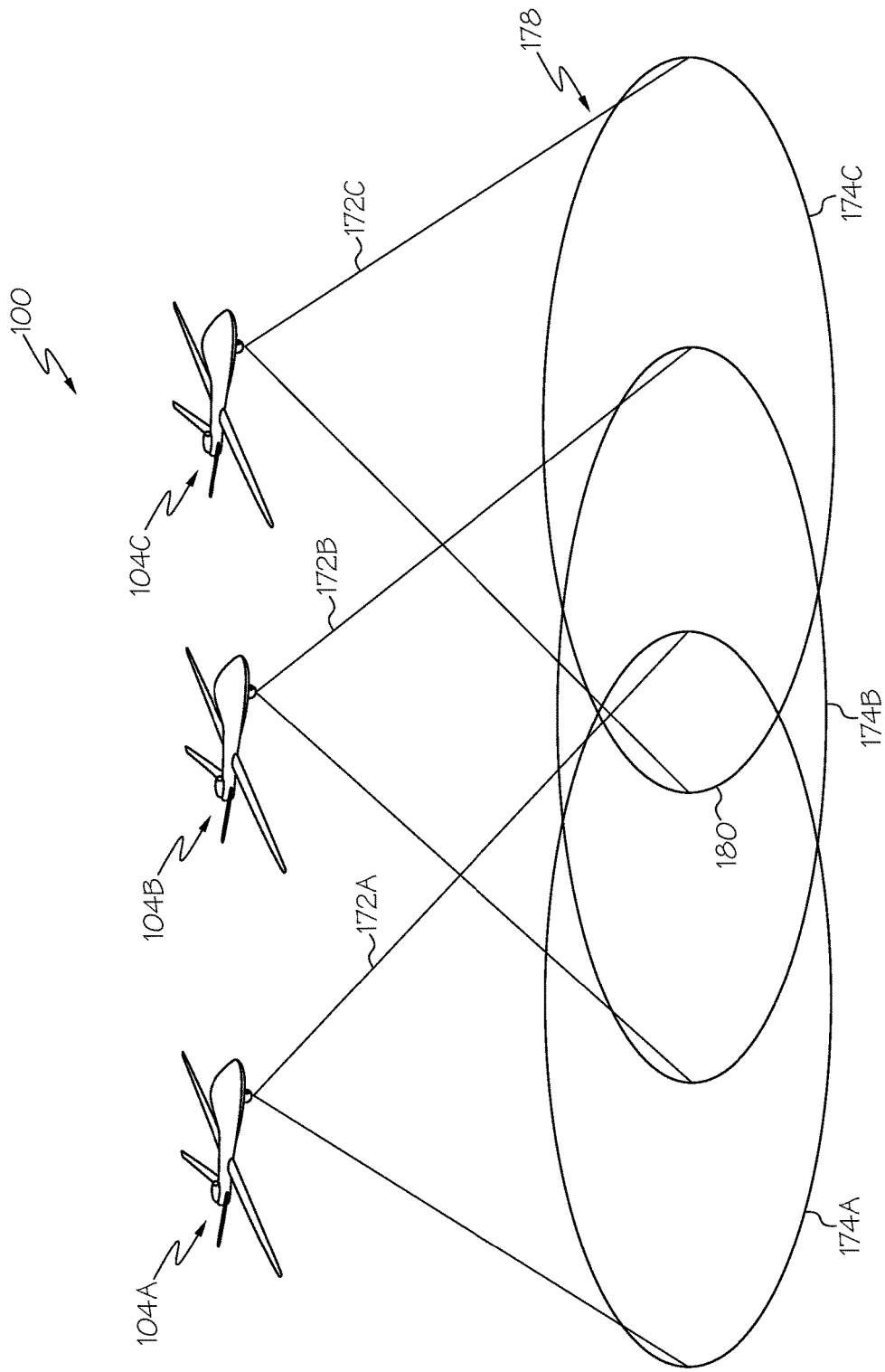
FIG. 12 is a schematic illustration of another example of the disclosed wireless communications system depicting a common ground cell.

FIG. 12 is a schematic illustration of another example of the disclosed wireless communications system 100. In this example, a plurality of relay terminals 104 (e.g., a constellation of satellites or a collection of aerial vehicles) (three relay terminals 104 are shown by example) transmits a plurality of RF spot beams 172 (three RF spot beams 172 are shown by example) defining a plurality of ground cells 174 (three ground cells 174 are shown by example). In the illustrated example, the first relay terminal 104A generates and directs the first RF spot beam 172A defining the first ground cell 174A, the second relay terminal 104B generates and directs the second RF spot beam 172B defining the second ground cell 174B, and the third relay terminal generates and directs the third RF spot beam 172C defining the third ground cell 174C. While three relay terminals 104 transmitting three RF spot beams 172 defining three associated ground cells 174 are shown by example in FIG. 12, in other examples, any number of relay terminals 104 may generate and direct any number of RF spot beams 172 defining any number of associated ground cells 174.

In this example, at least portions of two or more of the ground cells 174 overlap to cover the same area and form a common ground cell 180. Thus, the common ground cell 180 includes a service area shared by two or more ground cells 174. In the illustrated example, overlapping portions of the first ground cell 174A, the second ground cell 174B, and the third ground cell 174C form the common ground cell 180. Other common ground cells (not explicitly identified) are also formed, for example, by overlapping portions of the first ground cell 174A and the second ground cell 174B, overlapping portions of the first ground cell 174A and the third ground cell 174C, etc. As illustrated in FIG. 11, the common coverage area 178 may include a plurality of common ground cells 180.

In this example, multiple RF spot beams 172 (e.g., two or more RF spot beams 172), servicing the common ground cell 180, effectively increase the capacity and data transmit speed of the wireless communications link 108 (e.g., of the RTU link 116 and the UTR link 118) (FIG. 1) with user terminals 106 located within the common ground cell 180. As an example, the RF spot beams 172 generated and directed by the relay terminals 104 defining the common ground cell 180 operate at the same operating frequency. As another example, the RF spot beams 172 generated and directed by the relay terminals 104 defining the common ground cell 180 operate at different operating frequencies. The RF equipment 130 (FIG. 1) may utilize a predetermined multiplexing approach to combine multiple RF signals. As examples, the RF equipment 130 may utilize one or more of time multiplexing, polarization multiplexing, spatial multiplexing, and positional multiplexing.

Figure 13:
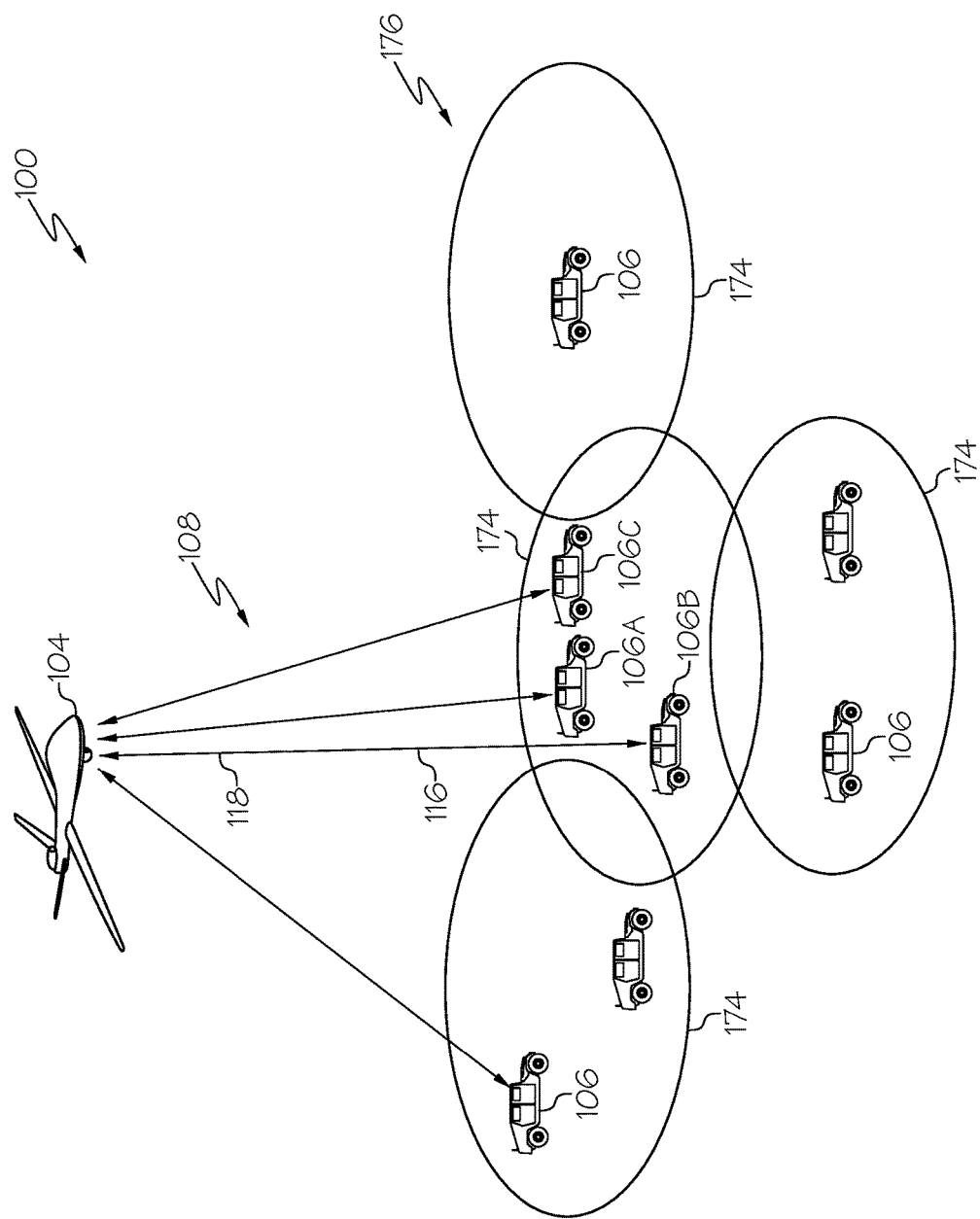
FIG. 13 is a schematic illustration of another example of the disclosed wireless communications system depicting the plurality of ground cells.

FIG. 13 is a schematic illustration of another example of the wireless communications system 100. In the illustrated example, each individual user terminal 106 has an individual wireless communications link 108 (e.g., RTU link 116 and UTR link 118) established with the relay terminal 104. In the examples described herein, at a given time, a plurality of user terminals 106 may be located within the same ground cell 174. Thus, the user terminals 106 are utilizing the same operating frequency to communicate with the same relay terminal 104 (FIGS. 9 and 10). When different user terminals 106 are far apart, for example, within the same ground cell 174 or in different ground cells 174, there may be no inter-carrier interference (ICI). However, different user terminals 106 being too close together may cause ICI between user terminals 106.

Figure 14:
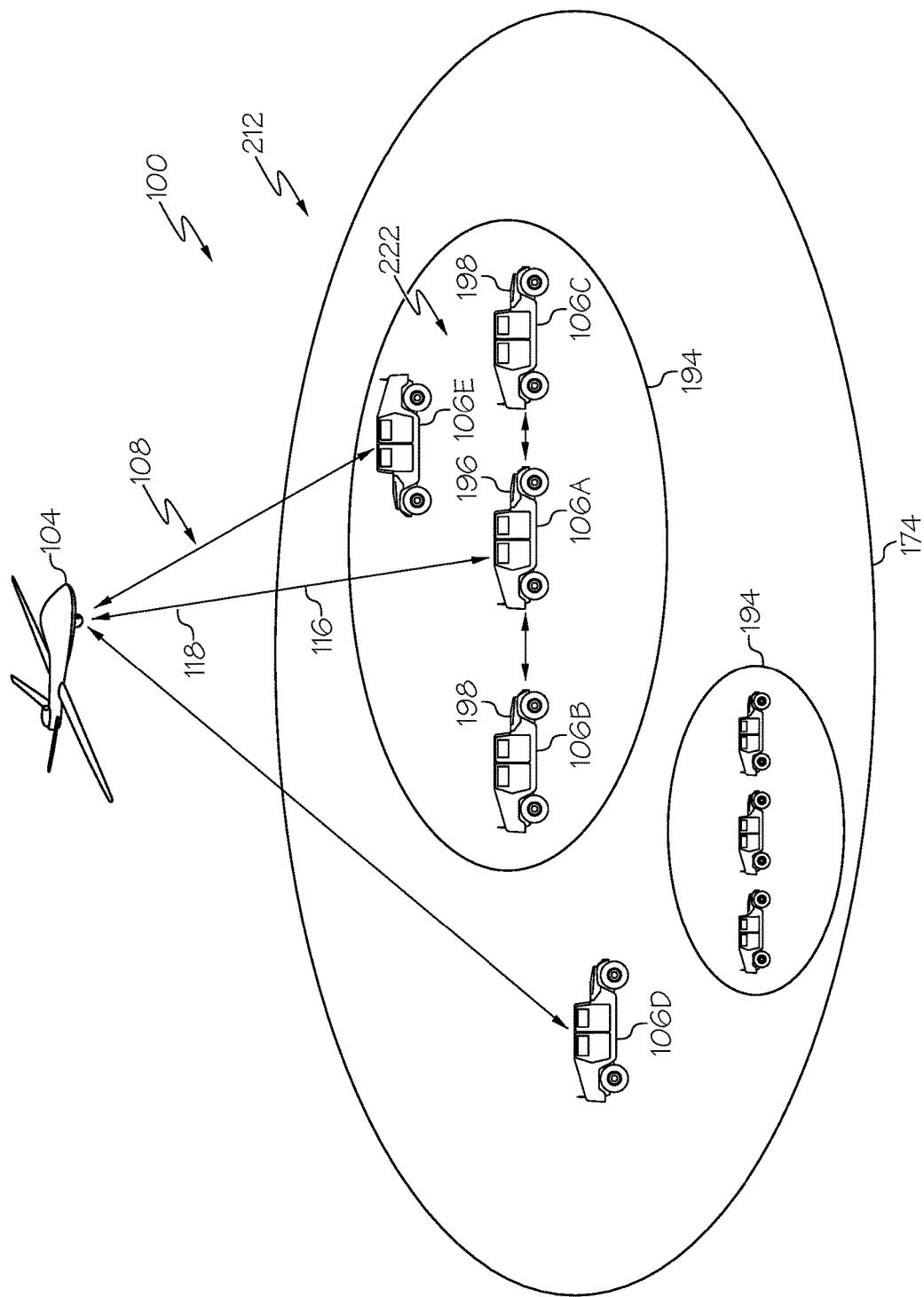
FIG. 14 is a schematic illustration of another example of the disclosed wireless communications system depicting a virtual cell.

FIG. 14 is a schematic illustration of another example of the wireless communications system 100. In this example, two or more of a plurality of user terminals 106 (three user terminals 106 are shown by example and individually identified as a first user terminal 106A, a second user terminal 106B, and a third user terminal 106C) are in sufficiently close proximity to potentially cause ICI between adjacent and proximate user terminals 106 when all of the user terminals 106 (e.g., the first user terminal 106A, the second user terminal 106B, and the third user terminal 106C are communicating directly with the same relay terminal 104. Another user terminal 106 (identified as a fourth user terminal 106D) is sufficiently far away from the other user terminals 106 not to cause ICI when communicating directly with the relay terminal 104.

In the exemplary embodiment, the wireless communications system 100 establishes a virtual cell 194 encompassing the user terminals 106 in close proximity to one another. The wireless communications system 100 designates one of the user terminals 106 to be the primary user terminal 196 (e.g., a master user terminal) and other ones of the user terminals 106 to be the secondary user terminals 198 (e.g., slave user terminals). The primary user terminal 196 establishes a wireless communications link and communicates data directly with the relay terminal 104. The secondary user terminals 198 establish a wireless communications link and communicate directly with the primary user terminal 196. Thus, the secondary user terminals 198 communicate with the relay terminal 104 indirectly through the primary user terminal 196. The wireless communications system 100 efficiently amalgamates or combines the data from the primary user terminal 196 and the secondary user terminals 198 for communication with the relay terminal 104.

While the virtual cell 194 shown by example in FIG. 14 includes three user terminals 106, in other examples, any number of user terminals 106 may be included within and communicate over the subnet 222 defined by the virtual cell 194. Similarly, while the example illustrated in FIG. 14 includes two virtual cells 194 established within the ground cell 174, in other examples, any number of virtual cells 194 may be established within the ground cell 174.

In various embodiments, the RF equipment 130 (FIG. 1) of the wireless communications system 100, for example, the control unit 182 (FIG. 1), performs the operational steps required to designate the primary user terminal 196 and the secondary user terminals 198, to establish the virtual cell 194, and amalgamate the data distributed between the primary user terminal 196 and the secondary user terminals 198 and transmitted between the primary user terminal 196 and the relay terminal 104. The operational steps may be implemented in whole or in part by one or more of the base station-RF equipment 124, the relay terminal-RF equipment 126, and/or the user terminal-RF equipment 128 (FIG. 1). The wireless communications system 100 utilizes frequency management to account for loading of the relay terminal 104 in order to maximize the capacity of the relay terminal 104.

As an example, the relay terminal-RF equipment 126 (FIG. 4) manages the number of RF spot beams 172 (FIG. 9) and the communications links between the user terminals 106. The relay terminal-RF equipment 126 determines which ones of the user terminals 106 will communicate over the local virtual cell 194 and which ones of the user terminals 106 will communicate directly with the relay terminal 104. The relay terminal-RF equipment 126 designates which ones of the user terminals 106 assigned to communicate within the virtual cell 194 will be the primary user terminal 196 and the secondary user terminals 198.

In this example, the user terminal-RF equipment 128, for example, the user terminal-antenna 140 (FIG. 3), of the primary user terminal 196 generates the virtual cell 194 and becomes a supernode for communication with the secondary user terminals 198. The virtual cell 194 effectively becomes a subnetwork, or subnet 222, to locally distribute data between the primary user terminal 196 and the secondary user terminals 198. In the example of mobile user terminals 106, the virtual cell 194 may be a wireless local area network, for example, a Wi-Fi network. In the example of stationary or fixed user terminals 106, the virtual cell 194 may be a wireless local area network or a wired local area network.

In this example, the relay terminal-RF equipment 126 coordinates the amalgamation of data. The user terminal-RF equipment 128 (FIG. 3) of the primary user terminal 196 amalgamates the data from the primary user terminal 196 and the secondary user terminals 198 distributed within the virtual cell 194 together into a single communications link with the relay terminal 104 in order to distribute the data more efficiently.

In this example, operational methods, tools and/or algorithms, for example, performed by one or more of the election module 184, the amalgamation module 186 and the optimization module 188 (FIG. 1), are used to optimize the total communications throughput of the relay terminal 104 by determining how many virtual cells 194 will be established to amalgamate data of the user terminals 106 located within the virtual cell 194, how many and which ones of the user terminals 106 will utilize the virtual cell 194 to communicate with the relay terminal 104, and how many and which ones of the user terminals 106 will communicate directly with the relay terminal 104.

Thus, in this example, a plurality of user terminals 106 share one wireless communications link 108 (e.g., RTU link 116 and UTR link 118). The user terminals 106 designated as secondary user terminals 198 are instructed to communicate with the user terminal 106 designated as the primary user terminal 196 over the subnet 222 established by the virtual cell 194. The RF equipment 130, for example, the control unit 182 (FIG. 1), coordinates and controls the wireless communications link 108 and the virtual cell 194. As examples, coordination and control may be provided by the user terminal-RF equipment 128 of the primary user terminal 196, the relay terminal-RF equipment 126, a central control center (not explicitly illustrated), for example, the base station-RF equipment 124, or a combination thereof. In any of these examples, the control unit 182 considers the capacity of the relay terminal 104 and manages formation of the virtual cells 194.

While the relay terminal 104 is depicted as an aerial vehicle in examples illustrated in FIGS. 8-14, in other examples, the relay terminal 104 may be a satellite or a combination of a satellite and an aerial vehicle as described above.

Figure 15:
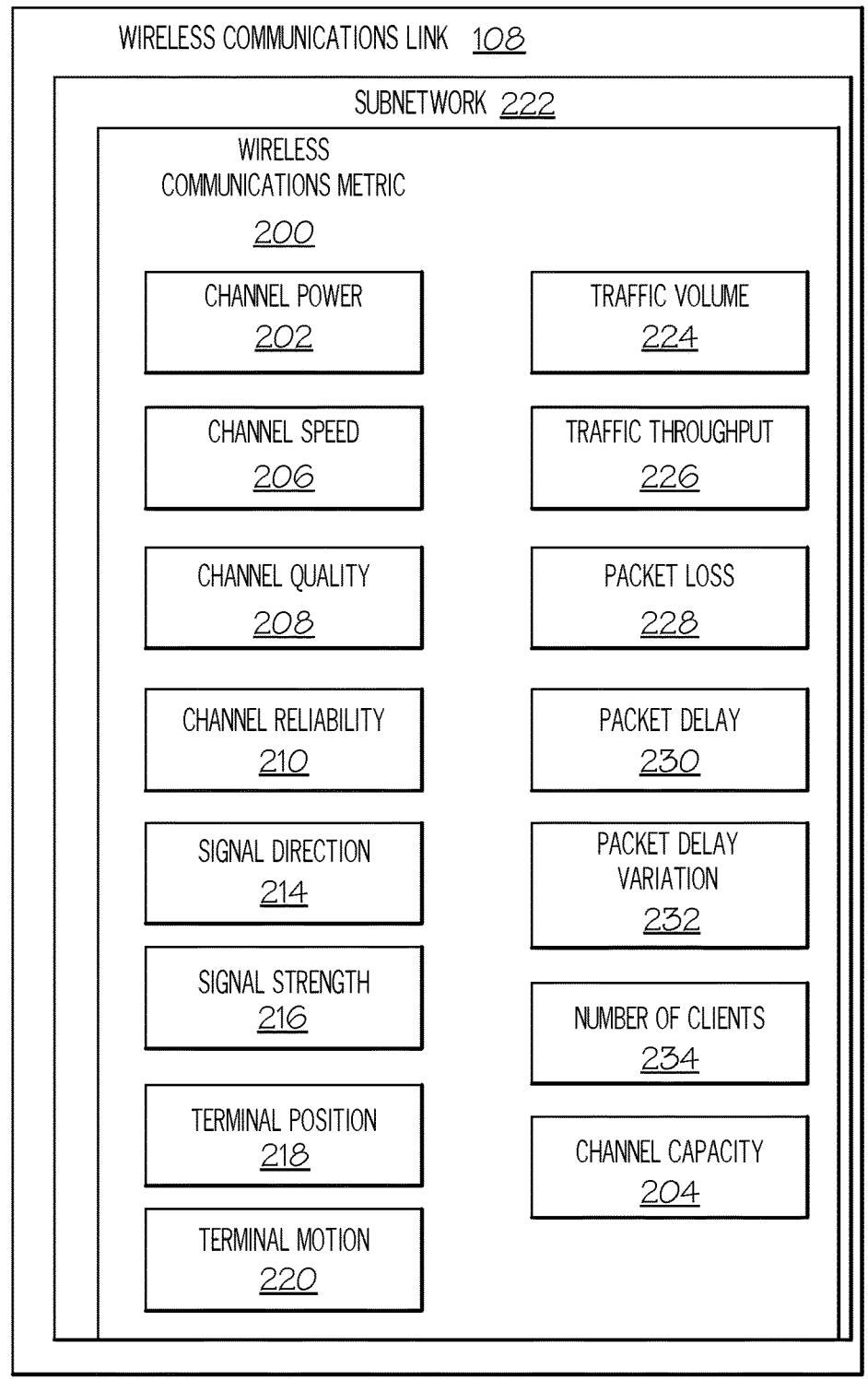
FIG. 15 is a schematic block diagram of one example of wireless communications metrics evaluated by the disclosed wireless communications system.

FIG. 15 is a schematic block diagram illustrating one example of wireless communications metrics 200. The wireless communications metrics 200 are wireless communications characteristics of the wireless communications link 108, for example, particularly wireless communications characteristics of the RTU link 116 and the UTR link 118 (FIG. 1). The wireless communications system 100, for example, the control unit 182, utilizes and/or evaluates one or more wireless communications metric 200 when managing establishment of the virtual cells 194 and selection of which one of the user terminals 106 will be designated as the primary user terminal 196 for direct communications contact with the relay terminal 104 and for distribution of data to the other user terminals 106 designated as the secondary user terminals 198.

As examples, the wireless communications metric 200 includes one or more of channel power 202, channel capacity 204, channel speed 206, channel quality 208 and/or channel reliability 210. As used herein, channel power 202 has its ordinary meaning as known to those skilled in the art and, for example, includes a measurement or quantification of signal power. As used herein, channel capacity 204 has its ordinary meaning as known to those skilled in the art and, for example, includes a measurement or quantification of available bandwidth. As used herein, channel speed 206 has its ordinary meaning as known to those skilled in the art and, for example, includes a measurement or quantification of data transfer rate. As used herein, channel quality 208 has its ordinary meaning as known to those skilled in the art and, for example, includes a measurement or quantification of signal quality index (SQI) such as used to measure power. As used herein, channel reliability 210 has its ordinary meaning as known to those skilled in the art and, for example, includes a measurement or quantification of signal-to-noise ratio (SNR).

As other examples, the wireless communications metric 200 may also include traffic volume 224, estimated traffic throughput 226, packet loss 228, packet delay 230, packet delay variation (e.g., jitter) 232, and number of 234. As used herein, traffic volume 224 has its ordinary meaning as known to those skilled in the art and, for example, includes a measurement or quantification of the size of the packets of data being transmitted along the wireless communications channel. As used herein, traffic throughput 116 has its ordinary meaning as known to those skilled in the art and, for example, includes a measurement or quantification of rate at which the packets of data are successfully delivered over the wireless communications channel. As used herein, packet loss 228 has its ordinary meaning as known to those skilled in the art and, for example, includes a measurement or quantification of packets of data that fail to reach their destination. As used herein, packet delay variation 232 has its ordinary meaning as known to those skilled in the art and, for example, includes a measurement or quantification of the difference in end-to-end one-way delay between selected packets in a flow with any lost packets being ignored. As used herein, number of clients 234 has its ordinary meaning as known to those skilled in the art and, for example, includes a measurement or quantification of number of host-side clients connected to all user terminals 106 that form the virtual cell 194.

As other examples, the wireless communications metric 200 includes one or more of signal direction 214 and/or received signal strength 216. As used herein, signal direction 214 has its ordinary meaning as known to those skilled in the art and, for example, includes a measurement or quantification of the transmitter power output. As used herein, received signal strength 216, or received signal strength indicator (RSSI), has its ordinary meaning as known to those skilled in the art and, for example, includes a measurement or quantification of the power present in a received radio signal. As an example, the signal direction 214 may be determined by the signal strength 216 of a directional antenna (e.g., the user terminal-antenna 140) (FIG. 3) of the user terminal 106.

As another example, the wireless communications metric 200 includes terminal position 218. As used herein, terminal position 218 refers to the relative position of the user terminals 106. The terminal position 218 may be determined by Global Positioning Satellite (GPS) information and used to calculate rectangular distance for geolocation and authentication of the user terminal 106 and/or coalescing of the plurality of user terminals 106 communicating through the virtual cell 194 (FIG. 14).

As yet another example, the wireless communications metric 200 includes terminal motion 220. As used herein, terminal motion 220 refers to the relative motion of the user terminals 106. The terminal motion 220 may include the relative motion between user terminals 106 and/or the relative motion between user terminals 106 and relay terminals 104, for example, when switching between different ones of the ground cells 174 (FIG. 13).

FIG. 16 is a flow diagram of one embodiment of the disclosed method 500 for managing the wireless communications network, for example, the wireless communications network 212 established by the disclosed wireless communications system 100 (FIG. 1).

In an exemplary embodiment, the method 500 includes the step of requesting communication from each of a plurality of user terminals 106 to the relay terminal 104, as shown at block 502. For example, this step may include requesting communication from a first one of the plurality of user terminals 106 (e.g., the first user terminal 106A) (FIG. 14) to the relay terminal 104 (e.g., requesting connection of a first wireless communications link), requesting communication from a second one of the plurality of user terminals 106 (e.g., the second user terminal 106B) (FIG. 14) to the relay terminal 104 (e.g., requesting connection of a second wireless communications link), requesting communication from a third one of the plurality of user terminals 106 (e.g., the third user terminal 106C) (FIG. 14) to the relay terminal 104 (e.g., requesting connection of a third wireless communications link), and requesting communication from a fourth one of the plurality of user terminals 106 (e.g., a fourth user terminal 106D) (FIG. 14) to the relay terminal 104 (e.g., requesting connection of a fourth wireless communications link), etc.

As an example, the first user terminal 106A, the second user terminal 106B, the third user terminal 106C, the fourth user terminal 106D etc. may initiate or broadcast a request to communicate with the relay terminal 104. The request may be received by the relay terminal 104. As an example, the request is evaluated by the control unit 182 (FIG. 1), for example, at the relay terminal 104 or at a central control center (e.g., the base station 102) (FIG. 1).

Next, one or more wireless communications metrics 200 (FIG. 15) of the wireless communications link 108 between each one of the plurality of user terminals 106 and the relay terminal 104 (FIG. 13) are evaluated, as shown at block 504. As an example, the wireless communications metrics 200 associated with the user terminal-RF equipment 128 (e.g., the user terminal-antenna 140) (FIG. 3) for each one of the plurality of user terminals 106 is evaluated. As used herein, evaluating one or more of the wireless communications metrics 200 includes making a comparison between wireless communications metrics 200 of different user terminals 106, making a comparison between wireless communications metrics 200 and a predetermined value and/or threshold or otherwise making a decision related to the user terminal 106 and/or the wireless communications link 108 based on wireless communications metrics 200.

As examples, the comparison between wireless communications metrics 200 of different user terminals 106, the comparison between wireless communications metrics 200 and a predetermined value and/or threshold, and decision related to the user terminal 106 and/or the wireless communications link 108 based on wireless communications metrics 200 may be based on instantaneous wireless communications metrics 200 collected at a given point in time or on a continuous set of wireless communications metrics 200 collected and stored over a period of time.

The application of machine learning and optimization algorithms may be used to elect the most effective primary user terminal 196 for the virtual cell 194 and operate efficiently in an RF environment where other external access points are dynamically competing for spectrum.

As an example, one or more wireless communications metrics 200 (FIG. 15) of the wireless communications link 108 between the first user terminal 106A and the relay terminal 104 (FIG. 13) are evaluated. Similarly, one or more wireless communications metrics 200 of the wireless communications link 108 between the second user terminal 106B and the relay terminal 104 are evaluated. Similarly, one or more wireless communications metrics 200 of the wireless communications link 108 between the third user terminal 106C and the relay terminal 14 are evaluated. Similarly, one or more wireless communications metrics 200 of the wireless communications link 108 between the fourth user terminal 106D and the relay terminal 14 are evaluated.

Next, each one of the plurality of user terminals 106 are nominated as candidates for inclusion in the communications subnet 222 that will be formed by the virtual cell 194 (FIG. 14) is made, as shown at block 506.

Next, a selection of which ones of the plurality of user terminals 106 that are candidates for inclusion in the communications subnet 222 that will be formed by the virtual cell 194 (FIG. 14) is made, as shown at block 508.

As an example, the election module 184 and/or the optimization module 188 of the control unit 182 (FIG. 1) evaluates the wireless communications metrics 200 for the first user terminal 106A, the second user terminal 106B, the third user terminal 106C, the fourth user terminal 106D, etc. in order to determine which ones of the user terminals 106 will form the virtual cell 194 (FIG. 14). As described above, one or more of channel power 202, channel capacity 204, channel speed 206, channel quality 208, channel reliability 210, signal direction 214, signal strength 216, relative terminal position 218, and/or relative terminal motion 220 are evaluated.

In an example, such as for ground-based mobile user terminals 106 (e.g., user terminal-RF equipment 128 mounted to ground-based mobile platforms 164) (FIG. 5) illustrated in FIG. 14, the first user terminal 106A, the second user terminal 106B, and the third user terminal 106C may be travelling together in close proximity, for example, in the same direction on the same roadway. In this example, the terminal position 218 and/or terminal motion 220 of the user terminals 106 may indicate that the first user terminal 106A, the second user terminal 106B, and the third user terminal 106C will be in sufficiently close proximity for a sufficient length of time to establish the virtual cell 194 (FIG. 14) and amalgamate data from the first user terminal 106A, the second user terminal 106B, and the third user terminal 106C. Therefore, the control unit 182 will select the first user terminal 106A, the second user terminal 106B and the third user terminal 106C for inclusion in the subnet 222 to be formed by the virtual cell 194. As used herein, a sufficient length of time refers to any period of time sufficient to establish and maintain a wireless communications link (e.g., a Wi-Fi link) between user terminals 106. Similarly, as used herein, sufficiently close proximity refers to any distance sufficient to establish and maintain a wireless communications link (e.g., a Wi-Fi link) between user terminals 106.

In another example for ground-based mobile user terminals 106, the fourth user terminal 106D may be travelling in the same direction as the first user terminal 106A, the second user terminal 106B, and the third user terminal 106C, however, the fourth user terminal 106D may be far away from any one of the first user terminal 106A, the second user terminal 106B, and the third user terminal 106C. In this example, the terminal position 218 and/or the terminal motion 220 of the user terminals 106 may indicate that the fourth user terminal 106D is in insufficiently close proximity to the first user terminal 106A, the second user terminal 106B, and the third user terminal 106C to establish the virtual cell 194 (FIG. 14) and amalgamate data from the fourth user terminal 106D and the first user terminal 106A, the second user terminal 106B, and the third user terminal 106C. Therefore, the control unit 182 will select the first user terminal 106A, the second user terminal 106B and the third user terminal 106C for inclusion in the subnet 222 to be formed by the virtual cell 194 and exclude the fourth user terminal 106D.

In yet another example for ground-based mobile user terminals 106, a fifth user terminal 106E may be travelling in an opposite direction to the first user terminal 106A, the second user terminal 106B, and the third user terminal 106C. In this example, the terminal position 218 and/or the terminal motion 220 of the user terminals 106 may indicate that the fifth user terminal 106E will be in sufficiently close proximity for an insufficient length of time to establish the virtual cell 194 (FIG. 14) and amalgamate data from fifth user terminal 106E and the first user terminal 106A, the second user terminal 106B, and the third user terminal 106C. Therefore, the control unit 182 will select the first user terminal 106A, the second user terminal 106B and the third user terminal 106C for inclusion in the subnet 222 to be formed by the virtual cell 194 and exclude the fifth user terminal 106E.

Next, each one of the plurality of user terminals 106 selected for inclusion in the subnet 222 to be formed by the virtual cell 194 (block 508) are nominated as the primary user terminal 196 (FIG. 14) to make a direct communications connection with the relay terminal 104, as shown at block 510.

As an example, and best illustrated in FIG. 14, the first user terminal 106A, the second user terminal 106B and the third user terminal 106C were selected for inclusion in the subnet 222 to be formed by the virtual cell 194. This, each one of the first user terminal 106A, the second user terminal 106B and the third user terminal 106C is nominated as the primary user terminal 196 (FIG. 14) to make a direct communications connection with the relay terminal 104.

Next, one of the nominated plurality of user terminals 106 (block 510) is elected or designated as the primary user terminal 196 (FIG. 14) to make a direct communications connection with the relay terminal 104 based on the evaluations of the wireless communications metrics 200 (block 504), as shown at block 512. The other ones of the plurality of user terminals 106 are designated as the secondary user terminal 198 (FIG. 14) to make a direct communications connection with the primary user terminal 196 and, thus, an indirect communications connection with the relay terminal 104 through the primary user terminal 196, as shown at block 514.

As examples, election or designation of one of the user terminals 106 as the primary user terminal 196 may be implemented either via terminal configuration, terminal policy, a distributed election protocol or a combination thereof. As used herein, terminal configuration, terminal policy and a distributed election protocol have their ordinary meanings as known to those skilled in the art.

As an example, the election module 184 and/or the optimization module 188 of the control unit 182 (FIG. 1) evaluates the wireless communications metrics 200 for the first user terminal 106A, the second user terminal 106B, and the third user terminal 106C, which were selected for the virtual cell 194 and nominated, in order to designate one of the first user terminal 106A, the second user terminal 106B, and the third user terminal 106C as the primary user terminal 196 (FIG. 14) and to optimize communication between the primary user terminal 196 and the relay terminal 104. As described above, one or more of channel power 202, channel capacity 204, channel speed 206, channel quality 208, channel reliability 210, signal direction 214, signal strength 216, relative terminal position 218, and/or relative terminal motion 220 are evaluated.

In this example, and as illustrated in FIG. 14, the first user terminal 106A, which was selected for the virtual cell 194 and nominated, is elected or designated as the primary user terminal 196 to make a direct communications connection with the relay terminal 104 based on the evaluations of the wireless communications metrics 200. The second user terminal 106B and the third user terminal 106C, which were also selected for the virtual cell 194 and nominated, are designated as the secondary user terminal 198 to make a direct communications connection with the primary user terminal 196 and, thus, an indirect communications connection with the relay terminal 104 through the primary user terminal 196.

In an example, the wireless communications link 108 between the first user terminal 106A and the relay terminal 104 may have a greater channel power 202, channel capacity 204, and/or channel speed 206 than the wireless communications link 108 between the second user terminal 106B or the third user terminal 106C and the relay terminal 104. For example, the user terminal-antenna 140 (FIG. 3) of the first user terminal 106A may be bigger and/or stronger than the user terminal-antenna 140 of the second user terminal 106B or the third user terminal 106C. In such an example, the control unit 182 (FIG. 1) elects or designates the first user terminal 106A as the primary user terminal 196 (FIG. 14) and designates the second user terminal 106B and the third user terminal 106C as the secondary user terminal 198 (FIG. 14).

In another example, the wireless communications metrics 200 may indicate that the wireless communications link 108 between the first user terminal 106A and the relay terminal 104 has a better channel quality 208 and/or channel reliability 210 than the wireless communications link 108 between the second user terminal 106B or the third user terminal 106C and the relay terminal 104. In such an example, the control unit 182 (FIG. 1) elects or designates the first user terminal 106A as the primary user terminal 196 (FIG. 14) and designates the second user terminal 106B and the third user terminal 106C as the secondary user terminal 198 (FIG. 14).

Next, the primary user terminal 196 (FIG. 14) is instructed to establish a direct communications connection with the relay terminal 104, as shown at block 516. The primary user terminal 196 (FIG. 14) is then instructed to establish the virtual cell 194 (FIG. 14), as shown at block 518. The secondary user terminals 198 (FIG. 14) are then instructed to establish a direct communications connection with the primary user terminal 196 for communication with the relay terminal 104, as shown at block 520.

Data from the primary user terminal 196 and the secondary user terminals 198 (FIG. 14) is amalgamated, as shown at block 522, and transmitted to the relay terminal 104 from the primary user terminal 196, as shown at block 524. Data is also transmitted from the relay terminal 104 to the primary user terminal 196 (block 524) and distributed from the primary user terminal 196 to the secondary user terminals 198 over the subnet 222 defined within the virtual cell 194 (FIG. 14), as shown at block 526.

The data distributed to and from the primary user terminal 196 and the secondary user terminals 198 (e.g., all of the user terminals 106 within the virtual cell 194) is amalgamated to increase capacity and/or reduce the load of the wireless communications link 108 between the relay terminal 104 and the user terminals 106 within the virtual cell 194. In the example illustrated in FIG. 14, only the first user terminal 106A, the fourth user terminal 106D and the fifth user terminal 106E communicate directly with the relay terminal 104. The first user terminal 106A, the second user terminal 106B, and the third user terminal 106C amalgamate data into one communications link between the first user terminal 106A and the relay terminal 104. Thus, the number of direct communications links between the user terminals 106 was reduced from five to three. Reducing the number of direct communications links with the relay terminal 104 by using a local subnet 222 between proximate user terminals 106 correspondingly reduces the power required by the relay terminal, increases the capacity of the relay terminal 104 and reduces link congestion.

Benefits of the amalgamation of data from the plurality of user terminals 106 and/or the coalescing of user terminals 106 within the virtual cell 194 may include optimization of local subnet 222 distribution for service users (e.g., cellular phone, personal electronic device, etc.) connected to the user terminals 106 through wired (e.g., for structures 168) (FIG. 5) or wireless (e.g., for structures 168, ground-based mobile platforms 164, etc.) (FIG. 5) for local connectivity, higher bandwidth efficient modulations (BEMS) performance on the wireless communications link 108 with higher signal to noise with higher gain antenna, and off-loading the relay terminal 104 to manage fewer higher capacity links versus many lower capacity links.

In one specific example, the subnet 222 defined within the virtual cell 194 (FIG. 14) for communication connection between the primary user terminal 196 and the secondary user terminal 198 is a Wi-Fi network, which limits or eliminates ICI between adjacent user terminals 106 and the relay terminal 104. As an example, the user terminal-RF equipment 128 (e.g., the user terminal-antenna 140) (FIG. 3) utilizes an IEEE 802.11ac or 802.11n standard using orthogonal frequency-division multiplexing (OFDM) in order to isolate the signal. As an example, the OFDM is based on at least one of orthogonal channel assignment and active beamforming, for example, depending upon the relative locations of the user terminals 106 within the virtual cell 194 (FIG. 14).

As an example, 802.11n access points can operate in either the 2.4 GHz or 5 GHz bands and can assign terminals to use a channel from a predefined collection of channels in the 2.4 GHz band or another collection of channels in the 5

GHz band. Conversely, 802.11 ac access points operate only in the 5 GHz band and can assign terminals to use one or more channels from a collection of channels in the 5 GHz band. The 802.11 ac standard also incorporates beamforming as a core functionality, allowing access points to direct the energy being radiated from the access point antenna directly at the terminals positioned randomly throughout the cell being serviced by the access point.

The control unit 182, for example, the election module 184, the amalgamation module 186, and/or the optimization module 188, includes decision logic used to manage selection of user terminals 106 to form the virtual cell 194 (FIG. 14), selection of the user terminal 106 designated as the primary user terminal 196 (e.g., the supernode) (FIG. 14) in contact with the relay terminal 104, and amalgamation and distribution of data between the primary user terminal 196 and the relay terminal 104 over the wireless communications link 108 (FIG. 14) and between the primary user terminal 196 and the secondary user terminals 198 (FIG. 14) over the subnet 222 defined by the virtual cell 194. Managing distribution of the direct wireless communications links 108 and selection of the user terminals 106 within the established virtual cell 194 may optimize the capacity and/or performance of the relay terminal 104.

As described above, and with reference to FIGS. 11 and 12, in some examples of the disclosed wireless communications system 100, one or more virtual cells 194 (FIG. 14) may be formed or located within the common coverage area 178 or, more particularly, within the common ground cell 180 formed by overlapping RF spot beams 172 from different ones of a plurality of relay terminals 104. In such an example, the wireless communications system 100 and the method 500 may detect a load imbalance between two or more relay terminals 104 covering the common ground cell 180 and/or a load imbalance between two or more virtual cells 194. As used herein, the term load imbalance refers to a situation where a first one of the plurality of relay terminals 104 (e.g., the first relay terminal 104A) has a higher load relative to the load of a second one of the plurality of relay terminals 104 (e.g., the second relay terminal 104B).

As an example, in a configuration having two or more relay terminals 104, one of the relay terminals 104 may be loaded more than another one of the relay terminals 104. In an example implementation of this situation, the wireless communications system 100 (e.g., the control unit 182) may direct one or more primary user terminal 196 to communicate with the lesser-loaded relay terminal 104 or switch communications from the heavier-loaded relay terminal 104 to the lesser-loaded relay terminal 104.

As another example, in a configuration having two or more virtual cells 194, one of the virtual cells 194 may be loaded more that another one of the virtual cells 194. In an example implementation of this situation, the wireless communications system 100 (e.g., the control unit 182) may direct one or more secondary user terminals 198 to communicate with a lesser-loaded primary user terminal 196 or switch from the heavier-loaded primary user terminal 196 to the lesser-loaded user terminal 196.

As such, in one example, the method 500 also includes the step of detecting the load imbalance above the predetermined threshold between a plurality of relay terminals 104 covering the common ground cell 180 (FIG. 12) in which one or more virtual cells 194 (FIG. 14) are located, as shown at block 528. In this example, in response to the detection of the load imbalance (block 528), the method 500 includes transferring at least one wireless communication link 108, for example, from the primary user terminal 196 of the virtual cell 194 in direct communication with the first relay terminal 104A or another user terminal 106 in direct communication with the first relay terminal 104A, from the first relay terminal 104A to the second relay terminal 104B, as shown at block 530. Alternatively, or in addition to, in this example, in response to the detection of the load imbalance (block 528), the method 500 includes reconfiguring the RF spot beams 172 projected from at least one of the first relay terminal 104A and the second relay terminal 104B, as shown at block 532. As examples, reconfiguring the RF spot beam 172 may include reconfiguring characteristics of the RF spot beam 172 including changing at least one of a beam center, a beam size, and a beam power.

In the disclosed examples, the number and/or position of user terminals 106 included within the virtual cell 194 may change over time. As an example, one mobile user terminal 106 may move to a position no longer suitable for inclusion within the virtual cell 194 (e.g., too far away from the primary user terminal 196). As another example, another mobile user terminal 106 may move into a position suitable for inclusion within the virtual cell 194 (e.g., sufficiently close to the primary user terminal 196). Similarly, the particular user terminal 106 elected and designated as the primary user terminal 196 may change as different user terminals 106 enter and exit the virtual cell 194, as new user terminals 106, for example, with different user terminal-antennas 140 enter the virtual cell 194, and/or as wireless communications metrics 200 change, for example, due to a change in location of one or more of the user terminals 106.

FIG. 17 is a flow diagram of one embodiment of the disclosed method 600 for optimizing the wireless communications network, for example the wireless communications network 212 established by the disclosed wireless communications system 100 (FIG. 1).

In an exemplary embodiment, the method 600 includes the step of establishing communication (e.g., a wireless communications link 108) between the first user terminal 106A (FIG. 14) and the relay terminal 104, as shown at block 602. The first user terminal 106A, designated as the primary user terminal 196, establishes the virtual cell 194 defining the subnetwork 222 for communications between the primary user terminal 194 and one or more secondary user terminals 198, as shown at block 618.

As an example, the first user terminal 106A has been designated as the primary user terminal 196 (FIG. 14), as shown at blocks 502-516 of FIG. 16, and the virtual cell 194 (FIG. 14) has been established, as shown at block 518 of FIG. 16.

Next, the second user terminal 106B (FIG. 14) requests direct communication with the first user terminal 106A in order to communicate with the relay terminal 104 through the first user terminal 106A (e.g., over the subnet 222 defined by the virtual cell 194), as shown at block 604. As an example, the second user terminal 106B may enter the virtual cell 194 and be located in sufficiently close proximity to the first user terminal 106A.

Next, the first user terminal 106A, serving as the primary user terminal 196, provisionally grants (e.g., allows) the request for communication with the first user terminal 106A, as shown at block 606.

Next, one or more wireless communications metrics 200 (FIG. 15) of the wireless communications link 108 between the second user terminal 106B and the first user terminal 106A are evaluated, as shown at block 608. As an example, the wireless communications metrics 200 associated with the user terminal-RF equipment 128 (e.g., the user terminal-antenna 140) (FIG. 3) for the second user terminal 106B is evaluated. As described above, one or more of channel power 202, channel capacity 204, channel speed 206, channel quality 208, channel reliability 210, signal direction 214, signal strength 216, relative terminal position 218, and/or relative terminal motion 220 are evaluated.

Next, a determination is made whether the second user terminal 106B is suitable for inclusion (e.g., remains included) within the communications subnet 222 formed by the virtual cell 194 (FIG. 14) based on the evaluations of the wireless communications metrics 200 of the second user terminal 106B (block 608), as shown at block 610. As an example, the second user terminal 106B is suitable for inclusion (e.g., remains included) within the communications subnet 222 when (e.g., if) the second user terminal 106B is in sufficiently close proximity to the first user terminal 106A (e.g., is located within the virtual cell 194) for a sufficient length of time and/or has user terminal-RF equipment 128 (FIG. 3) capable of communicating with the first user terminal 106A serving as the supernode of the subnet 222.

As an example, the election module 184 and/or the optimization module 188 of the control unit 182 (FIG. 1) evaluates the wireless communications metrics 200 for the second user terminal 106B in order to determine whether the second user terminal 106B is a suitable candidate for inclusion in the communications subnet 222 formed by the virtual cell 194 (FIG. 14), for example, based on the relative location and/or relative motion of the second user terminal 106B.

If the evaluation of the wireless communications metrics 200 indicates that the second user terminal 106B is not suitable for inclusion in the communications subnet 222 formed by the virtual cell 194, then the request for communication with the first user terminal 106A is denied, as shown at block 612.

Next, if the evaluation of the wireless communications metrics 200 indicates that the second user terminal 106B is suitable for inclusion in the communications subnet 222 formed by the virtual cell 194, then one or more wireless communications metrics 200 (FIG. 15) of the wireless communications link 108 between the first user terminal 106A and the relay terminal 104 are evaluated, as shown at block 614. As an example, the wireless communications metrics 200 associated with the user terminal-RF equipment 128 (e.g., the user terminal-antenna 140) (FIG. 3) for the first user terminal 106A, serving as the primary user terminal 196, is evaluated. As described above, one or more of channel power 202, channel capacity 204, channel speed 206, channel quality 208, channel reliability 210, signal direction 214, signal strength 216, relative terminal position 218, and/or relative terminal motion 220 are evaluated.

Next, a determination is made whether the wireless communications link 108 between the first user terminal 106A and the relay terminal 104 is sufficient and/or suitable for inclusion of the second user terminal 106B based on the evaluations of the wireless communications metrics 200 (block 612), as shown at block 616. As an example, the wireless communications link 108 between the first user terminal 106A and the relay terminal 104 is sufficient and/or suitable for inclusion of the second user terminal 106B when (e.g., if) the wireless communications link 108 and/or the relay terminal 104 is capable of handling the additional data associated with the second user terminal 106B to communicate with the relay terminal 104 through the first user terminal 106A (e.g., the relay terminal 104 has the available capacity and/or power).

As an example, the election module 184 and/or the optimization module 188 of the control unit 182 (FIG. 1) evaluates the wireless communications metrics 200 for the first user terminal 106A in order to determine whether the second user terminal 106B is a suitable candidate for inclusion in the communications subnet 222 formed by the virtual cell 194 (FIG. 14) and amalgamation of data from the second user terminal 106B, for example, based on one or more of channel power 202, channel capacity 204, channel speed 206, channel quality 208, and/or channel reliability 210 of the wireless communications link 108 between the first user terminal 106A and the relay terminal 104.

If the evaluation of the wireless communications metrics 200 indicates that the wireless communications link 108 between the first user terminal 106A and the relay terminal 104 is not suitable for inclusion of the second user terminal 106B and amalgamation of data from the second user terminal 106B, then the request for communication with the relay terminal 104 through the first user terminal 106A is denied, as shown at block 612.

In examples of the disclosed wireless communications system 100 where one or more virtual cells 194 (FIG. 14) are formed or located within the common coverage area 178 or, more particularly, within the common ground cell 180 formed by overlapping RF spot beams 172 from different ones of a plurality of relay terminals 104, when the communications request is denied (blocks 612), for example, by the first user terminal 106A, designated at the primary user terminal 196, or by the relay terminal 104, the second user terminal may be directed to communicate directly with another one of the plurality of relay terminals.

Next, if the evaluation of the wireless communications metrics 200 indicates that the second user terminal 106B is suitable for inclusion in the communications subnet 222 formed by the virtual cell 194, then the second user terminal 106B is designated as a secondary user terminal 198 (FIG. 14), as shown at block 620, and the request for communication with the relay terminal 104 through the first user terminal 106A is granted (e.g., allowed), as shown at block 622.

The process step of one of granting the request for communication with the relay terminal 104 through the first user terminal 106A or denying the request for communication with the relay terminal 104 through the first user terminal 106A may also be referred to as admission control.

The second user terminal 106B, designated as the secondary user terminal 198 (FIG. 14) is then instructed to establish a direct communications connection with the primary user terminal 196 for communication with the relay terminal 104, as shown at block 624.

Data from the first user terminal 106A, designated as the primary user terminal 196, and the second user terminal 106B, designated as the secondary user terminal 198 (FIG. 14) is then amalgamated, as shown at block 626, and transmitted to the relay terminal 104 from the first user terminal 106A, as shown at block 628. Data is also transmitted from the relay terminal 104 to the first user terminal 106A (block 524) and distributed from the first user terminal 106A to one or more of the second/third user terminals 106B/106C, etc. over the subnet 222 defined within the virtual cell 194 (FIG. 14), as shown at block 630.

In various embodiments, evaluation of the wireless communications metrics 200 of the first user terminal 106A, designated as the primary user terminal 196, and the one or more second user terminals 106B, designated as the secondary user terminals 198, may be performed regularly or continuously to maintain or change the designation of the primary user terminal 196 and the secondary user terminals 198.

As such, the wireless communications metrics 200 of the wireless communications link 108 between the first user terminal 106A and the relay terminal 104 and between the second user terminal 106B and the relay terminal 104 may be monitored, evaluated and compared. Based on the updated evaluation of the wireless communications metrics 200, the user terminals 106 designated as the primary user terminal 196 and the secondary user terminal 198 may remain the same or change.

As an example, upon evaluation of the wireless communications metrics 200 between the first user terminal 106A and the relay terminal 104 and between the second user terminal 106B and the relay terminal 104, it may be determined that the wireless communications link 108 between the second user terminal 106B and the relay terminal 104 may have a greater channel power 202, channel capacity 204, channel speed 206, channel quality 208, and/or channel reliability 210 than the wireless communications link 108 between the first user terminal 106A. For instance, the user terminal-antenna 140 (FIG. 3) of the second user terminal 106B may be bigger and/or more powerful than the user terminal-antenna 140 of the first user terminal 106A. In such an example, the control unit 182 (FIG. 1) promotes the second user terminal 106B as the primary user terminal 196 (FIG. 14), in other words, elects or designates the second user terminal 106B as a replacement primary user terminal 196 and demotes the first user terminal 106A as the secondary user terminal 198, in other words, elects or designates the first user terminal 106A as a replacement secondary user terminal 198 (FIG. 14).

As another example, upon evaluation of the wireless communications metrics 200 between the first user terminal 106A and the relay terminal 104 and between the second user terminal 106B and the relay terminal 104, it may be determined that the wireless communications link 108 between the first user terminal 106A and the relay terminal 104 may have a greater channel power 202, channel capacity 204, channel speed 206, channel quality 208, and/or channel reliability 210 than the wireless communications link 108 between the second user terminal 106B. For instance, the user terminal-antenna 140 of the first user terminal 106A may be bigger and/or more powerful than the user terminal-antenna 140 of the second user terminal 106B. In such an example, the control unit 182 maintains the first user terminal 106A as the primary user terminal 196, in other words, elects or designates the first user terminal 106A as the replacement primary user terminal 196 and maintains the second user terminal 106B as the secondary user terminal 198 or, in other words, elects or designates the second user terminal 106B as the replacement secondary user terminal 198.

Accordingly, in an embodiment of the disclosed method 600, the first user terminal 106A and the second user terminal 106B are nominated to serve as the primary user terminal 196 (FIG. 14) that will replace the user terminal 106 currently serving as the primary user terminal 196 to make a direct communications connection with the relay terminal 104, as shown at block 632.

Next, the wireless communications metrics 200 of the wireless communications links 108 between the first user terminal 106A and the relay terminal 104 and between the second user terminal 106B and the relay terminal 104 are evaluated, as shown at block 634.

Next, one of the first user terminal 106A or the second user terminal 106B is elected or designated as the replacement primary user terminal 196 (FIG. 14) to make a direct communications connection with the relay terminal 104 based on the evaluations of the wireless communications metrics 200 associated with the first user terminal 106A and the second user terminal 106B, as shown at block 634. The other one of the first user terminal 106A or the second user terminal 106B is designated as the replacement secondary user terminal 198 (FIG. 14) to make a direct communications connection with the primary user terminal 196 and, thus, an indirect communications connection with the relay terminal 104 through the primary user terminal 196, as shown at block 636.

The newly designated replacement primary user terminal 196 is connected to the relay terminal 104 and establishes the wireless communication link 108 between the replacement primary user terminal 196 and the relay terminal 104, as shown at block 640. The newly designated secondary user terminal 198 is connected to the relay terminal 104 through the replacement primary user terminal 196, as shown at block 642.

Thus, as one example, the second user terminal 106B, may be designated as the replacement primary user terminal 196 (FIG. 14) to serve as the supernode of the communications subnet 222 formed by the virtual cell 194 (FIG. 14). Data from the second user terminal 106B, now designated as the replacement primary user terminal 196, and the first user terminal 106A, now designated as the replacement secondary user terminal 198, may be amalgamated (block 626) and transmitted (block 628) to the relay terminal 104 from the second user terminal 106B. Data is also transmitted from the relay terminal 104 to the second user terminal 106B and distributed (block 630) from the second user terminal 106B to the first user terminal 106A over the subnet 222 defined within the virtual cell 194 (FIG. 14).

The disclosed method 600 may be repeated when another user terminal 106 (e.g., the third user terminal 106C) enters the virtual cell 194 and requests permission to communicate with the relay terminal 104 through the second user terminal 106B, now designated the primary user terminal 196. As an example, the method 600 may continue to receive communication requests from additional user terminals (block 604) and grant (block 622) or deny (block 612) communication requests from additional user terminals 104 for inclusion into the subnet 222 defined by the virtual cell 194 created by the replacement primary user terminal 196 for indirect communication with the relay terminal 104 (block 624).

In the various disclosed embodiments, the user terminals 106 may dynamically negotiate their role (e.g., as the primary user terminal 196 and as the secondary user terminal 198) through the use of a distributed election protocol that is agnostic of the interconnection topology of the network (e.g., the subnet 222). This problem is similar to that of determining the minimum spanning tree of a graph and has a number of solutions known to those skilled in the art, for example, from the fields of distributed computing, mechanism design (e.g., game theory), and Mobile Ad-Hoc Networks (MANET).

In the various embodiments, the wireless communications system 100 may choose the communication topography for the user terminals 106 using the subnet 222 defined by the virtual cell 194. As an example, a policy may be established that defines the subnet 222 as any collection of user terminals 106 that share an adjacency (e.g., a common radio link). This collection of user terminals 106 may then elect the primary user terminal 196 for the subnet 222 using parameters that describe terminal capability (e.g. user terminal capacity, user terminal-to-relay terminal link quality, user terminal-to-user terminal link quality, etc.). These multiple constraints may then be used as a weighted sum to elect the primary user terminal 196 via an established distributed election protocol.

Throughout the disclosure, various components of the disclosed wireless communications system 100 are described as "modules". For the purpose of the present disclosure, the term module may include hardware, software or a combination of hardware and software. As one example, a module may include a processor, a storage device (e.g., a memory), an input device and/or a display. The module may also include a computer-readable storage medium having instructions that, when executed by the processor causes the processor to perform or execute the described functions.

Similarly, those skilled in the art will appreciate that the logical operations of method 500 and method 600 may be implemented (1) as a sequence of computer implemented steps or program modules running on a computing system and/or (2) as interconnected machine logic circuits or circuit modules within the computing system. The particular implementation of method 500 and/or method 600 may be a matter of choice dependent on the performance and other operating parameters of the computing system. Accordingly, the logical operations described herein may be referred to as steps or modules. These steps and modules may be implemented in software, in firmware, in hardware, in special purpose digital logic, and/or any combination thereof. For example, embodiments of method 500 and method 600 may be performed by embodiments of wireless communications system 100, including by one or all of the modules described above with respect to FIG. 1.

Reference herein to "embodiment" means that one or more feature, structure, element, component or characteristic described in connection with the embodiment is included in at least one implementation of the disclosed invention. Thus, the phrase "one embodiment," "another embodiment," and similar language throughout the present disclosure may, but do not necessarily, refer to the same embodiment. Further, the subject matter characterizing any one embodiment may, but does not necessarily, include the subject matter characterizing any other embodiment.

Similarly, reference herein to "example" means that one or more feature, structure, element, component or characteristic described in connection with the example is included in at least one embodiment. Thus, the phrases "one example," "another example," and similar language throughout the present disclosure may, but do not necessarily, refer to the same example. Further, the subject matter characterizing any one example may, but does not necessarily, include the subject matter characterizing any other example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

In FIGS. 1-4 and 15, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1-4 and 15 may be combined in various ways without the need to include other features described in FIGS. 1-4 and 15, other drawing figures, and/or the accompanying disclosure, even though such combination or combinations are not explicitly illustrated herein. Similarly, additional features not limited to the examples presented, may be combined with some or all of the features shown and described herein.

In FIGS. 16A, 16B, 17A and 17B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16A, 16B, 17A and 17B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Although various embodiments of the disclosed system and methods have been shown and described, modifications may occur to those skilled in the art upon reading the specification. The present application includes such modifications and is limited only by the scope of the claims.

What is claimed is:

1. A method for managing a wireless communications system, said method comprising:

requesting wireless communication links between a plurality of user terminals and an airborne communications relay terminal;
designating one of said plurality of user terminals as a primary user terminal to make a direct communication with said relay terminal;
designating other ones of said plurality of user terminals as secondary user terminals to make direct communication with said primary user terminal;
connecting said primary user terminal directly to said relay terminal;
requesting, from one of said secondary user terminals, communications with said relay terminal through said primary user terminal;
one of granting and denying a communications request between said one of said secondary user terminals and said relay terminal through said primary user terminal;
connecting said one of said secondary user terminals indirectly to said relay terminal through said primary user terminal;
requesting, from another user terminal, communications with said relay terminal through said primary user terminal;
one of granting and denying a communications request between said another user terminal and said relay terminal through said primary user terminal;
designating said another user terminal as another one of said secondary user terminals;
connecting said another one of said secondary user terminals indirectly to said relay terminal through said primary user terminal in response to a grant of said communications with said relay terminal through said primary user terminal; and
amalgamating data from said primary user terminal and said secondary user terminals for communication with said relay terminal.

2. The method of claim 1 further comprising:
evaluating at least one wireless communications metric of said each one of said plurality of user terminals; and
nominating each one of said plurality of user terminals as said primary user terminal,
wherein designating said one of said plurality of user terminals as said primary user terminal is based on an evaluation of said at least one wireless communications metric of said each one of said plurality of user terminals.

3. The method of claim 2 wherein said wireless communication metric comprises at least one of channel power, channel capacity, channel speed, channel quality and channel reliability.

4. The method of claim 1 further comprising establishing, with said primary user terminal, a virtual cell defining a subnetwork for communications between said primary user terminal and said secondary user terminals.

5. The method of claim 4 further comprising:
evaluating at least one wireless communications metric of each one of said plurality of user terminals; and
nominating each one of said plurality of user terminals for inclusion in said subnetwork, and
selecting individual ones of said plurality of user terminals for inclusion in said subnetwork based on an evaluation of said at least one wireless communications metric of each one of said plurality of user terminals.

6. The method of claim 5 wherein said wireless communications metric comprises at least one of signal direction, signal strength, relative terminal position and relative terminal motion.

7. The method of claim 1 wherein each one of said plurality of user terminals comprises one of a ground-based mobile platform, an airborne mobile platform and a stationary structure carrying user terminal-radio frequency equipment, and wherein each one of said plurality of user terminals provides communications service to at least one connected device.

8. The method of claim 1 wherein said relay terminal comprises an airborne platform carrying relay terminal-radio frequency equipment, and wherein said airborne platform comprises one of a high altitude aerial vehicle and a satellite.

9. The method of claim 1 further comprising:
detecting a load imbalance between said relay terminal and another relay terminal; and
at least one of:
transferring one of said wireless communications links from said relay terminal to said another relay terminal; and
reconfiguring a radio frequency spot beam generated by said relay terminal.

10. The method of claim 1 further comprising:
designating one of said primary user terminal and said secondary user terminals as a replacement primary user terminal to make a direct communication with said relay terminal;
designating another one of said primary user terminal and said secondary user terminal as a replacement secondary user terminal to make direct communication with said replacement primary user terminal;
connecting said replacement primary user terminal directly to said relay terminal; and
connecting said replacement secondary user terminal indirectly to said relay terminal through said replacement primary user terminal.

11. A method for optimizing a wireless communications network, said method comprising:
establishing a wireless communications link between a first user terminal and an airborne communications relay terminal;
requesting, from a second user terminal, communications with said relay terminal through said first user terminal;
one of granting and denying a communications request between said second user terminal and said relay terminal through said first user terminal;
connecting said second user terminal indirectly to said relay terminal through said first user terminal in response to a grant of said communications request with said relay terminal through said first user terminal;
designating one of said first user terminal and said second user terminal as a replacement primary user terminal to make a direct communication with said relay terminal;
designating another one of said first user terminal and said second user terminal as a replacement secondary user terminal to make direct communication with said replacement primary user terminal;
connecting said replacement primary user terminal directly to said relay terminal; and
connecting said replacement secondary user terminal indirectly to said relay terminal through said replacement primary user terminal.

12. The method of claim 11 further comprising:
evaluating at least one wireless communications metric of said first user terminal; and determining whether said wireless communications link is sufficient for inclusion of said second user terminal based on an evaluation of said at least one wireless communications metric.

13. The method of claim 12 wherein said wireless communication metric comprises at least one of channel power, channel capacity, channel speed, channel quality and channel reliability.

14. The method of claim 11 further comprising:
establishing, with said first user terminal designated as a primary user terminal, a virtual cell defining a subnetwork for communications between said primary user terminal and one or more secondary user terminals;
evaluating at least one wireless communications metric of said second user terminal; and
determining whether said second user terminal is suitable for inclusion within said subnetwork based on an evaluation of said at least one wireless communications metric.

15. The method of claim 14 wherein said wireless communications metric comprises at least one of signal direction, signal strength, relative terminal position and relative terminal motion.

16. The method of claim 11 further comprising amalgamating data from said first user terminal and said second user terminal for communication with said relay terminal.

17. The method of claim 11 further comprising:
nominating each one of said first user terminal and said second user terminal as said replacement primary user terminal; and
evaluating at least one wireless communications metric of said each one of said first user terminal and said second user terminal,
wherein designation of said one of said first user terminal and said second user terminal as said replacement primary user terminal is based on an evaluation of said at least one wireless communications metric of said each one of said first user terminal and said second user terminal.

18. The method of claim 11 wherein each one of said first user terminal and said second user terminal comprises one of a ground-based mobile platform, an airborne mobile platform and a stationary structure carrying user terminal-radio frequency equipment, and wherein each one of said first user terminal and said second user terminal provides communications service to at least one connected device.

19. The method of claim 11 further comprising:
requesting, from a third user terminal, communications with said relay terminal through said replacement primary user terminal;
one of granting and denying a communications request between said third user terminal and said relay terminal through said replacement primary user terminal;
designating said third user terminal as another replacement secondary user terminal;
connecting said another replacement secondary user terminal indirectly to said relay terminal through said replacement primary user terminal in response to a grant of said communications with said relay terminal through said replacement primary user terminal.

20. The method of claim 19 further comprising amalgamating data from said replacement primary user terminal, said replacement secondary user terminal, and said another replacement secondary user terminal for communication with said relay terminal.

21. A wireless communications system comprising:
an airborne communications relay terminal providing communications coverage over a coverage area;
a plurality of user terminals located within said coverage area; and
radio frequency equipment distributed among said relay terminal and said plurality of user terminals to establish wireless communications links between said relay terminal and said plurality of user terminals, said radio frequency equipment comprising a control unit configured to:
request said wireless communication links between said plurality of user terminals and said relay terminal;
designate one of said plurality of user terminals as a primary user terminal to make a direct communication with said relay terminal;
designate other ones of said plurality of user terminals as secondary user terminals to make direct communication with said primary user terminal;
connect said primary user terminal directly to said relay terminal;
request, from one of said secondary user terminals, communications with said relay terminal through said primary user terminal;
one of grant and deny a communications request between said one of said secondary user terminals and said relay terminal through said primary user terminal;
connect said one of said secondary user terminals indirectly to said relay terminal through said primary user terminal in response to a grant of said communications request with said relay terminal through said first user terminal;
designate one of said plurality of user terminals as a replacement primary user terminal to make a direct communication with said relay terminal;
designate other ones of said plurality of user terminals as a replacement secondary user terminal to make direct communication with said replacement primary user terminal;
connect said replacement primary user terminal directly to said relay terminal; and
connect said replacement secondary user terminal indirectly to said relay terminal through said replacement primary user terminal.

22. The system of claim 21 wherein said control unit is further configured to amalgamate data from said primary user terminal and said secondary user terminals for communication with said relay terminal.

23. The system of claim 21 wherein said control unit is further configured to:
evaluate at least one wireless communications metric of each one of said plurality of user terminals; and
nominate each one of said plurality of user terminals as said primary user terminal; and
wherein designation of said one of said plurality of user terminals as said primary user terminal is based on an evaluation of said at least one wireless communications metric of each one of said plurality of user terminals.

24. The system of claim 21 wherein said control unit is further configured to establish, by said primary user terminal, a virtual cell defining a subnetwork for communications between said primary user terminal and said secondary user terminals.

25. The system of claim 24 wherein said control unit is further configured to:

evaluate at least one wireless communications metric of each one of said plurality of user terminals;

nominate each one of said plurality of user terminals for inclusion in said subnetwork; and select individual ones of said plurality of user terminals for inclusion in said subnetwork based on an evaluation of said at least one wireless communications metric of said each one of said plurality of user terminals.

26. The system of claim 25 wherein said control unit is further configured to:

request, from another user terminal, communications with said relay terminal through said primary user terminal; and one of grant and deny a communications request between said another user terminal and said relay terminal through said primary user terminal.

27. The system of claim 26 wherein said control unit is further configured to:

evaluate at least one wireless communications metric said another user terminal; and determine whether said another user terminal is suitable for inclusion within said subnetwork based on an evaluation of said at least one wireless communications metric of said another user terminal.

28. The system of claim 27 wherein said control unit is further configured to:

evaluate at least one wireless communications metric of said primary user terminal; and determine whether a wireless communications link between said primary user terminal and said relay terminal is sufficient for inclusion of said another user terminal based on an evaluation of said at least one wireless communications metric.

29. The system of claim 28 wherein said control unit is further configured to:

designate said another user terminal as another one of said secondary user terminals;

connect said another one of said secondary user terminals indirectly to said relay terminal through said primary user terminal in response to a grant of said communications with said relay terminal through said primary user terminal; and amalgamate data from said primary user terminal and said secondary user terminals for communication with said relay terminal.

30. The system of claim 29 wherein said control unit is further configured to:

evaluate said at least one wireless communications metric of said primary user terminal and said secondary user terminals;

designate one of said primary user terminal and said second user terminals as a replacement primary user terminal to make a direct communication with said relay terminal;

designate other ones of said primary user terminal and said second user terminals as replacement secondary user terminals to make direct communication with said replacement primary user terminal;

connect said replacement primary user terminal directly to said relay terminal; and connect said replacement secondary user terminal indirectly to said relay terminal through said replacement primary user terminal.

* * * * *